US008527182B2

(12) United States Patent
Minami et al.

(10) Patent No.: US 8,527,182 B2

(45) Date of Patent: Sep. 3, 2013

(54) FUEL INJECTION AMOUNT CONTROL APPARATUS FOR INTERNAL COMBUSTION ENGINE, CONTROL SYSTEM FOR POWER UNIT, AND FUEL INJECTION AMOUNT CONTROL METHOD FOR INTERNAL COMBUSTION ENGINE

(75) Inventors: Masahiro Minami, Toyota (JP); Takeshi Miyaura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 511 days.

(21) Appl. No.: 12/993,403

(22) PCT Filed: Jul. 16, 2009

(86) PCT No.: PCT/IB2009/006252

§ 371 (c)(1), (2), (4) Date: Nov. 18, 2010

(87) PCT Pub. No.: WO2010/007508

PCT Pub. Date: Jan. 21, 2010

(65) Prior Publication Data

US 2011/0077841 A1 Mar. 31, 2011

(30) Foreign Application Priority Data

Jul. 16, 2008 (JP) ................................ 2008-185268

(51) Int. Cl.
*B60T 7/12* (2006.01)

(52) U.S. Cl.
USPC ........... 701/103; 701/114; 701/115; 123/434; 123/674

(58) Field of Classification Search
USPC ................. 701/103–105, 114, 115; 123/434, 123/123/435, 436, 674, 679, 681, 687, 689, 123/690, 478, 480
See application file for complete search history.

(56) References Cited

U.S. PATENT DOCUMENTS 4,627,402 A 12/1986 Saito et al.
5,715,796 A * 2/1998 Suzuki et al. ................. 123/492

(Continued)

FOREIGN PATENT DOCUMENTS

DE 10 2006 000331 2/2007
JP 2002 89333 3/2002

(Continued)

OTHER PUBLICATIONS

Office Action issued Apr. 26, 2010, in Japanese Patent Application No. 2008-185268, filed Jul. 16, 2008 (with English-language Translation).

(Continued)

*Primary Examiner* — John Kwon

(74) *Attorney, Agent, or Firm* — Oblon, Spivak, McClelland, Maier & Neustadt, L.L.P.

(57) ABSTRACT

A fuel injection amount control apparatus for an internal combustion engine includes an ECU that commands a learning-purpose injection when a first learning condition regarding operation state and a second learning condition regarding load connection state are satisfied, and calculates an injection performance value that corresponds to the actual injection amount based on the amount of change in rotation speed, and further determines whether a delay of the learning process is permitted based on whether the learning process, despite occurrence of the delay, can be completed before the injector performance reaches a permissible limit value, and forces, when the delay is not permitted, the load connection state to be a specific connection state so as to satisfy the second learning condition. When it is determined that the delay of the learning process is permitted, the delay is permitted until the two learning conditions are satisfied.

13 Claims, 10 Drawing Sheets

(56) References Cited

U.S. PATENT DOCUMENTS

| | | | | | |
|---|---|---|---|---|---|
| 5,794,604 | A * | 8/1998 | Suzuki et al. | 123/673 |
| 5,839,415 | A * | 11/1998 | Suzuki et al. | 123/491 |
| 5,878,711 | A * | 3/1999 | Kamura et al. | 123/295 |
| 6,510,692 | B2 * | 1/2003 | Shirakawa | 60/602 |
| 6,625,985 | B2 * | 9/2003 | Shirakawa | 60/602 |
| 6,817,321 | B2 * | 11/2004 | Takei et al. | 123/41.09 |
| 7,163,007 | B2 * | 1/2007 | Sasaki et al. | 123/673 |
| 7,337,766 | B2 * | 3/2008 | Nakayama et al. | 123/435 |
| 7,725,247 | B2 * | 5/2010 | Iwazaki | 701/114 |
| 7,779,619 | B2 * | 8/2010 | Takubo | 60/277 |
| 2008/0004785 | A1 | 1/2008 | Ikeda | |

FOREIGN PATENT DOCUMENTS

| | | |
|---|---|---|
| JP | 2003 247447 | 9/2003 |
| JP | 2003 278584 | 10/2003 |
| JP | 2005 36788 | 2/2005 |
| JP | 2005 291174 | 10/2005 |
| JP | 2007 023789 | 2/2007 |
| JP | 2007 269199 | 10/2007 |
| JP | 2008 014264 | 1/2008 |

OTHER PUBLICATIONS

International Search Report issued Nov. 5, 2009 in PCT/IB09/006252 filed Jul. 16, 2009.

* cited by examiner

FUEL INJECTION AMOUNT CONTROL APPARATUS FOR INTERNAL COMBUSTION ENGINE, CONTROL SYSTEM FOR POWER UNIT, AND FUEL INJECTION AMOUNT CONTROL METHOD FOR INTERNAL COMBUSTION ENGINE

BACKGROUND OF THE INVENTION

1. Field of the Invention

The invention relates to a fuel injection amount control apparatus for an internal combustion engine, a control system for a power unit, and a fuel injection amount control method for an internal combustion engine. Particularly, the invention relates to a fuel injection amount control apparatus for an internal combustion engine, a control system for a power unit, and a fuel injection amount control method for an internal combustion engine which learn degradation of the injection performance of fuel injection valves of a vehicle-mounted internal combustion engine, and execute an actual fuel injection amount control according to the injection performance.

2. Description of the Related Art

Generally, internal combustion engines mounted in vehicles and, particularly, engines in which pressurized high-pressure fuel is injected by a high-response injector by a plurality of divided injection actions, such as recent diesel engines, are required to deliver good injection performance of causing the amount of fuel that is actually injected from the injector, that is, the actual injection amount, to accurately follow a target injection amount of a pilot injection or the like, which is a very small amount (i.e., the corresponding injection amount command value is a very small value). On the other hand, the injection accuracy of the injector with respect to the commanded injection amount, that is, the accuracy of the fuel injection amount control, gradually declines due to aging or time-dependent changes. Therefore, there has been developed an apparatus that grasps the degree of the time-dependent decline of the fuel injection accuracy of the injector by a learning process, and corrects the commanded injection amount to the injector so that a required actual injection amount is obtained.

As an example of a related-art fuel injection amount control apparatus of this kind for an internal combustion engine, there is known an apparatus constructed on the basis of a fact that in an idle rotation speed control (hereinafter, referred to as "ISC"), the injection amount command value is corrected so that an idling rotation speed can be maintained regardless of the time-dependent degradation of the injector, or the like, that is, an apparatus that learns the idle injection amount command value during ISC, and that curbs the decline in the accuracy of the fuel injection amount control that is caused by the time-dependent degradation of the injector, by correcting the injection amount command value during a normal operation by an amount corresponding to the time-dependent degradation of the injector on the basis of the learned value of the idle injection amount command value (e.g., see Japanese Patent Application Publication No. 2003-247447 (JP-A-2003-247447)). When an accessory load, such as the compressor of an air conditioner apparatus, or the like, is on, the foregoing control apparatus temporarily stops the driving of the accessory load. After executing the learning of the correction amount corresponding to the time-dependent degradation of the injector, the control apparatus restarts the accessory load.

It is known that the command value of the idle fuel injection amount remains a minimum value during a certain period of operation of the engine after being reduced as the engine friction decreases during the break-in operation period, and then the command value gradually increases as the injection efficiency of the injectors declines due to a long time of use. On the basis of this fact, a fuel injection amount control apparatus (e.g., see Japanese Patent Application Publication 2002-89333 (JP-A-2002-89333)) sets a difference between the foregoing minimum value as a reference value and the present average idle injection amount command value, as an index value that indicates the degree of time-dependent degradation of the injectors, and sets as a prerequisite condition for the learning the condition that the engine operation is in an idle stable state, the condition that the cooling water temperature is equal to or higher than a predetermined temperature, the condition that the air conditioner is off, the condition that the amount of fluctuation of the learned value of the idle injection amount command value is in a predetermined range without a change in the clutch engagement state or the like, the condition that the electric load is small, the condition that the elapsed time from the starting of the engine is longer than or equal to a certain length of time, the condition that the idle-up control is not being executed, the condition that the amount of fluctuation in engine rotation speed is within a predetermined range, etc. When a state in which the prerequisite condition is satisfied continues for a predetermined time or longer, the control apparatus calculates the difference that indicates the degree of decline in the injection accuracy.

There is known another fuel injection amount control apparatus (e.g., see Japanese Patent Application Publication No. 2005-36788 (JP-A-2005-36788)) that executes a learning-purpose injection with a very small amount of fuel during a specific state of the engine in which fuel injection is not executed, and then finds a difference in engine rotation speed between the case where the learning-purpose injection is executed and the case where the learning-purpose injection is not executed (the amount of rise in engine rotation speed caused by the learning-purpose injection), and accurately calculates the actual injection amount of fuel that was actually injected from the injector by the learning-purpose injection, on the basis of the amount of rise in engine rotation speed.

However, in the foregoing fuel injection amount control apparatus for an internal combustion engine or the control system for a power unit that includes the fuel injection amount control apparatus in the related art, since the relation between the engine rotation speed and the fuel injection amount tends to deteriorate due to variations among cylinders or fluctuations of accessory loads, it is not easy to perform a highly accurate injection amount control by correcting the injection amount command value for ordinary engine operation through the use of an injection amount correction value obtained during an idle rotation speed control. Moreover, in the foregoing related-art technologies, since the accessory loads are uniformly stopped from operating when the learning process for injection amount accuracy is executed, there is a problem of decline of drivability (meaning, in this application, not only the running performance of the vehicle but also the responsiveness of the vehicle side to commanding operations performed by a driver).

Besides, in the fuel injection amount control apparatus for an internal combustion engine in the related art which executes the learning-purpose injection of a very small amount of fuel during the specific vehicle operation state in which the engine has no fuel injection, the highly accurate learning of injection amount is possible, but that learning process can be executed only during the specific operation state in which the amount of rise in engine rotation speed caused by the learning-purpose injection of very small amount of fuel can be detected. Therefore, if a vehicle travel mode in which the engine operation state that allows the learning is unlikely to occur is set, it becomes difficult to promptly complete the learning process, so that the injection amount accuracy sometimes declines.

Concretely, for example, in the case where a lockup mechanism-equipped automatic transmission of a vehicle is completely locked-up, the rotation shaft of the transmission side is directly coupled to the engine, so that if the learning-purpose injection of very small amount of fuel is executed, the amount of rise in engine rotation speed cannot be accurately or appropriately determined. During an ordinary travel mode, the operation state of the vehicle is appropriately changed between an operation state in which the lockup mechanism is completely locked up and an operation state in which the lockup mechanism is not completely locked up (the torque converter slips) according to the state of travel of the vehicle. Therefore, the learning process can be executed when the completely locked-up state is not present. That is, as shown in FIG. 10A, since the degradation of an injector gradually progresses as the accumulated travel distance of the vehicle increases, periods for executing the learning process are set so that the learning process is executed before the injection amount accuracy of the injector reaches a certain permissible limit value Li (a line of accuracy shown by a dotted line in the diagram). In this manner, a required injection amount accuracy can be maintained. However, in a vehicle having an automatic transmission that is equipped with a manual shift function that enables a driver to perform shift operations to gear speeds or the like as the driver desires, the driver may sometimes continue to drive the vehicle in a manual shift mode in which the manual shift function is effective. Furthermore, in a vehicle having a lockup mechanism-equipped automatic transmission in which the complete lockup is executed in a quite low vehicle speed region for improved fuel economy or the like, the duration of the travel of the vehicle with the lockup mechanism being completely locked up can be considerably long. In such cases, the learning process cannot be completed within a certain period of time, and thus the opportunities of the learning decrease, so that the reliability of the learned value declines. Therefore, in the control apparatus in the related art, there is a possibility of failing to complete the learning process even after the fuel injection accuracy of the injector exceeds a permissible limit value Li as shown in FIG. 10B.

Thus, in the fuel injection amount control apparatuses for internal combustion engines and the control systems for a power unit that include the control apparatuses in the related art, the drivability is allowed to deteriorate in order to secure a certain time for the learning process, or while good drivability is secured, the learning time becomes insufficient, so that the injection amount accuracy declines. Thus, the related-art technologies cannot achieve both securement of good drivability and securement of good injection amount accuracy.

SUMMARY OF THE INVENTION

The invention provides a fuel injection amount control apparatus for an internal combustion engine that is capable of achieving both securement of drivability and securement of accuracy in the fuel injection amount of injectors, and also provides a control system for a power unit that includes the fuel injection amount control apparatus, and a fuel injection amount control method for an internal combustion engine.

A fuel injection amount control apparatus for an internal combustion engine in accordance with a first aspect of the invention is a fuel injection amount control apparatus which generates an injection command signal that commands an injector of the internal combustion engine to inject fuel, and executes a learning process of learning change in fuel injection performance of the injector under a pre-set learning condition, and corrects the injection command signal according to a result of the learning process. The fuel injection amount control apparatus includes: rotation speed detection means for detecting engine rotation speed of the internal combustion engine; first determination means for determining whether or not a first learning condition regarding operation state of the internal combustion engine is satisfied; second determination means for determining whether or not a second learning condition regarding load connection state of the internal combustion engine is satisfied; learning-purpose injection command means for commanding the injector to perform a learning-purpose injection with a pre-set commanded injection amount when it is determined that both the first learning condition and the second learning condition are satisfied; performance value calculation means for calculating an amount of change in the engine rotation speed of the internal combustion engine caused by the learning-purpose injection based on detected information from the rotation speed detection means, when the learning-purpose injection is performed by the injector according to the command from the learning-purpose injection command means, and calculating an injection performance value that corresponds to an actual injection amount of the injector based on the amount of change; correction means for correcting the injection command signal according to a difference between the actual injection amount of the injector that is specifically determined from the injection performance value and the commanded injection amount that is commanded to the injector; third determination means for determining whether or not a delay equal to or longer than a certain length of time which occurs in the learning process is permitted, based on whether or not the learning process, despite occurrence of the delay of the learning process, is able to be completed before the fuel injection performance of the injector reaches a pre-set permissible limit value; and compulsive signal output means for outputting a compulsive signal that forces the load connection state of the internal combustion engine to be a specific connection state so as to satisfy the second learning condition, when it is determined by the third determination means that the delay of the learning process is not permitted. When it is determined by the third determination means that the delay of the learning process is permitted, the delay of the learning process is permitted until it is determined that both the first learning condition and the second learning condition are satisfied.

Due to this construction, when it is determined that the delay of the learning process is not permitted, the compulsive signal that forces the load connection state of the internal combustion engine to be a specific connection state (or change to a specific connection state) is output so as to satisfy the second learning condition, whereby the learning process is certainly executed. Thus, a required injection amount accuracy is secured. On the other hand, when it is determined by the third determination means that the delay of the learning process is permitted, the delay of the learning process is permitted until it is determined that both the first learning condition and the second learning condition are satisfied. Thus, drivability is secured. Hence, both securement of drivability and securement of injection amount accuracy of the injectors can be achieved.

In the fuel injection amount control apparatus for an internal combustion engine in accordance with the first aspect of the invention, the internal combustion engine may be mounted in a vehicle, and the vehicle may include a power transmission apparatus that has a torque converter that transmits power from the internal combustion engine, and a lockup mechanism that locks up the torque converter, and the compulsive signal may be a command signal that prohibits lockup performed by the lockup mechanism.

Due to this construction, even in the case where the time of travel during which the complete lockup is present is long and therefore the completion of the learning process requires a considerable amount of time, the learning process can be certainly completed before the injection amount accuracy of the injector exceeds a permissible limit value. Besides, the traveling of the vehicle in the travel mode according to the driver's taste or desire is not frequently restricted for the learning process.

Besides, the third determination means may determine a timing at which the delay of the learning process becomes impermissible in order to complete the learning process immediately before the fuel injection performance of the injector reaches the permissible limit value, based on accumulated information that is substantially equivalent to an accumulated time of use of the injector.

Due to this construction, the learning process can be completed immediately before the fuel injection performance of the injector reaches the permissible limit value. Thus, the frequency at which the load connection state of the internal combustion engine (the locked-up state of the lockup mechanism) is restricted can be sufficiently lessened, so that drivability is secured. Incidentally, the aforementioned accumulated information that is substantially equivalent to the accumulated time of use of the injector is, for example, a travel distance of the vehicle, and may also be an accumulated operation time of an internal combustion engine, the accumulated number of times of injection from the injector, or the injection time.

Besides, the foregoing fuel injection amount control apparatus for an internal combustion engine may further include: action mode determination means for determining whether or not, among a plurality of action modes regarding a load connected to the internal combustion engine, a first action mode of changing the load connection state of the internal combustion engine between the specific connection state and another connection state outside the specific connection state has been set; and fourth determination means for determining whether or not the delay equal to or longer than the certain length of time which occurs in the learning process is permitted, based on whether or not, despite occurrence of the delay of the learning process, the fuel injection performance of the injector is able to be maintained in a specific range of the fuel injection performance that is better than the permissible limit value. Then, if it is determined by the action mode determination means that the first action mode has been set, it is determined by the fourth determination means that the delay of the learning process is not permitted, it is determined by the first determination means that the first learning condition is satisfied, and it is determined by the second determination means that the second learning condition is not satisfied, the compulsive signal output means may output the compulsive signal.

Due to this construction, during action modes in which drivability is not easily affected, priority is given to the learning process, so that the learning process is relatively early completed. Thus, the injection amount accuracy of the injector can be maintained at a high level.

Besides, the action mode determination means may determine whether or not, among the plurality of action modes, a second mode of always constraining the load connection state of the internal combustion engine to the load connection state outside the specific load connection state has been set. When it is determined by the fourth determination means that the delay of the learning process is permitted while it is determined that the second action mode has been set, the compulsive signal output means may restrict output of the compulsive signal until it is determined by the third determination means that the delay of the learning process is not permitted.

Due to this construction, during an action mode in which drivability is easily affected, drivability can be secured by permitting the delay of the learning process as long as the learning process can be completed before the injection performance reaches the permissible limit.

A second aspect of the invention is a control system for a power unit that includes an internal combustion engine, and an automatic transmission that has a torque converter that transmits power from the internal combustion engine, and a lockup mechanism that locks up the torque converter. The control system includes: a fuel injection amount control apparatus which generates an injection command signal that commands an injector of the internal combustion engine to inject fuel, and which learns change in fuel injection performance of the injector under a pre-set learning condition, and which corrects the injection command signal according to a result of learning; and a lockup control apparatus that controls operation of the lockup mechanism of the automatic transmission. The fuel injection amount control apparatus includes: rotation speed detection means for detecting engine rotation speed of the internal combustion engine; first determination means for determining whether or not a first learning condition regarding operation state of the internal combustion engine is satisfied; second determination means for determining whether or not a second learning condition regarding operation state of the lockup mechanism is satisfied; learning-purpose injection command means for commanding the injector to perform a learning-purpose injection with a pre-set commanded injection amount when it is determined that both the first learning condition and the second learning condition are satisfied; performance value calculation means for calculating an amount of change in the engine rotation speed of the internal combustion engine caused by the learning-purpose injection based on detected information from the rotation speed detection means, when the learning-purpose injection is performed by the injector according to the command from the learning-purpose injection command means, and calculating an injection performance value that corresponds to an actual injection amount of the injector based on the amount of change; correction means for correcting the injection command signal according to a difference between the actual injection amount of the injector that is specifically determined from the injection performance value and the commanded injection amount that is commanded to the injector, third determination means for determining whether or not a delay equal to or longer than a certain length of time which occurs in the learning process is permitted, based on whether or not the learning process, despite occurrence of the delay of the learning process, is able to be completed before the fuel injection performance of the injector reaches a pre-set permissible limit value; and compulsive signal output means for outputting to the lockup control apparatus a compulsive signal that forces a completely locked-up state of the lockup mechanism to be prohibited so as to satisfy the second learning condition, when it is determined by the first determination means that the first learning condition is satisfied and it is determined by the second determination means that the second learning condition is not satisfied while it is determined by the third determination means that the delay of the learning process is not permitted. When the lockup control apparatus inputs the compulsive signal, the lockup control apparatus restricts action of the lockup mechanism within a range in which the lockup mechanism does not assume the completely locked-up state, and when it is determined by the third determination means that the delay of the learning process is permitted, the control system permits the delay of the learning process until it is determined that both the first learning condition and the second learning condition are satisfied.

Due to this construction, when the first learning condition is satisfied and the second learning condition is not satisfied while it is determined that the delay of the learning process is not permitted, the compulsive signal that forces the completely locked-up state of the lockup mechanism to be prohibited is output so as to satisfy the second learning condition. Therefore, the learning process is executed, so that a required injection amount accuracy is secured. On the other hand, when it is determined by the third determination means that delay of the learning process is permitted, the delay of the learning process is permitted until it is determined that the first learning condition and the second learning condition are both satisfied. Thus, drivability is secured. Hence, both securement of drivability and securement of injection amount accuracy of the injector can be achieved.

The control system for a power unit in accordance with the second aspect of the invention may further include: action mode determination means for, among a plurality of action modes regarding a load connected to the internal combustion engine, a first action mode of changing the action of the lockup mechanism between a non-constraint state in which the action of the lockup mechanism is not constrained to a completely locked-up state and a constraint state in which the action of the lockup mechanism is constrained to the completely locked-up state has been set; and fourth determination means for determining whether or not the delay equal to or longer than the certain length of time which occurs in the learning process is permitted, based on whether or not, despite occurrence of the delay of the learning process, the fuel injection performance of the injector is able to be maintained in a specific range of the fuel injection performance that is better than the permissible limit value. If it is determined by the action mode determination means that the first action mode has been set, it is determined by the fourth determination means that the delay of the learning process is not permitted, it may be determined by the first determination means that the first learning condition is satisfied, and it is determined by the second determination means that the second learning condition is not satisfied, the compulsive signal output means may output the compulsive signal.

Due to this construction, during the first action mode in which drivability is not easily affected, a certain degree of priority is given to the learning process so as to complete the learning process relatively early. Thus, the injection amount accuracy of the injector can be kept at a good level.

Besides, the first action mode may be a high-vehicle-speed-time lockup mode in which the action of the lockup mechanism is constrained to the completely locked-up state when the vehicle travels at or above a certain vehicle speed, and the action of the lockup mechanism is not constrained to the completely locked-up state when the vehicle travels below the certain vehicle speed.

Due to this construction, during the action mode in which the lockup mechanism is completely locked up when the vehicle travels at high speed, a certain degree of priority is given to the learning process so as to complete the learning process relatively early. Thus, the injection amount accuracy of the injector can be kept at a relatively good level.

Besides, the action mode determination means may determine whether or not, among the plurality of action modes, a second action mode of always constraining the action of the lockup mechanism to the completely locked-up state has been set. When it is determined by the fourth determination means that the delay of the learning process is permitted while it is determined that the second action mode has been set, the compulsive signal output means may restrict output of the compulsive signal until it is determined by the third determination means that the delay of the learning process is not permitted.

Due to this construction, during the second action mode in which drivability is easily affected, when the learning process for the injection performance, despite a delay equal to or longer than a certain length of time, can be completed before the fuel injection performance reaches a permissible limit value, the learning process is delayed to some extent. Hence, drivability during second action mode can be secured.

Besides, the foregoing control system for a power unit may further include fifth determination means for determining whether or not the delay equal to or longer than the certain length of time which occurs in the learning process is permitted, based on whether or not, despite occurrence of the delay of the learning process, the fuel injection performance of the injector is able to be kept within a high-accuracy region that is pre-set within the specific range of the fuel injection performance. Furthermore, the action mode determination means may determine whether or not, among the plurality of action modes, a third action mode in which the action of the lockup mechanism is temporarily changed to the completely locked-up state only when it is preferable that the action of the lockup mechanism be in the completely locked-up state in view of fuel economy of the internal combustion engine and power performance of the power unit has been set. When it is determined by the fifth determination means that the delay of the learning process is not permitted while it is determined that the third action mode has been set, the compulsive signal output means may output the compulsive signal.

Due to this construction, during the third action mode in which drivability is the least easily affected, the compulsive signal is output and the learning process is thus given priority when the fuel injection performance of the injector can not be kept within the high-accuracy region. Hence, in the case of a driver who tends to often drive in the third action mode, the injection amount accuracy of the injectors can be kept at high level.

Besides, the internal combustion engine may be a diesel engine in which a fuel injection from the injector during a compression stroke is executed by a plurality of divided injection actions that include an injection of a very small amount, and the learning-purpose injection may be executed with a commanded injection amount that is close to the very small amount of injection.

In diesel engines, the correlation between the amount of fuel injection and the generated torque of the internal combustion engine is high, and the amount of rise in engine rotation speed caused by the learning-purpose injection can be accurately calculated. Hence, even if the learning-purpose injection is an injection of very small amount of fuel, the learning process for the injector injection performance can be executed with ease and at low cost, and effective correction of the commanded injection amount can be performed.

Besides, the commanded injection amount may be a fuel injection amount that is close to a pilot injection amount that is provided near a piston top dead center of the internal combustion engine.

Due to this construction, as the learning-purpose injection is performed with a very small amount of fuel that is similar to the amount of the pilot injection, the highly accurate learning process for the injector injection performance can be executed with ease and at low cost, and effective correction of the commanded injection amount can be performed.

A third aspect of the invention is a fuel injection amount control method for an internal combustion engine which generates an injection command signal that commands an injector of the internal combustion engine to inject fuel, and executes a learning process of learning change in fuel injection performance of the injector under a pre-set learning condition, and corrects the injection command signal according to a result of the learning process, the control method including:

detecting engine rotation speed of the internal combustion engine;

determining whether or not a first learning condition regarding operation state of the internal combustion engine is satisfied;

determining whether or not a second learning condition regarding load connection state of the internal combustion engine is satisfied;

commanding the injector to perform a learning-purpose injection with a pre-set commanded injection amount when it is determined that both the first learning condition and the second learning condition are satisfied;

calculating an amount of change in the engine rotation speed of the internal combustion engine caused by the learning-purpose injection based on the engine rotation speed detected, when the learning-purpose injection is performed by the injector, and calculating an injection performance value that corresponds to an actual injection amount of the injector based on the amount of change;

correcting the injection command signal according to a difference between the actual injection amount of the injector that is specifically determined from the injection performance value and the commanded injection amount that is commanded to the injector;

determining whether or not a delay equal to or longer than a certain length of time which occurs in the learning process is permitted, based on whether or not the learning process, despite occurrence of the delay of the learning process, is able to be completed before the fuel injection performance of the injector reaches a pre-set permissible limit value; and outputting a compulsive signal that forces the load connection state of the internal combustion engine to be a specific connection state so as to satisfy the second learning condition, when it is determined that the delay of the learning process is not permitted, wherein when it is determined that the delay of the learning process is permitted, the delay of the learning process is permitted until it is determined that both the first learning condition and the second learning condition are satisfied.

Due to this construction, when it is determined that the delay of the learning process is not permitted, the compulsive signal that forces the load connection state of the internal combustion engine to be a specific connection state (or change to a specific connection state) is output so as to satisfy the second learning condition, whereby the learning process is certainly executed. Thus, a required injection amount accuracy is secured. On the other hand, when it is determined by the third determination means that the delay of the learning process is permitted, the delay of the learning process is permitted until it is determined that both the first learning condition and the second learning condition are satisfied. Thus, drivability is secured. Hence, both securement of drivability and securement of injection amount accuracy of the injectors can be achieved.

According to the fuel injection amount control apparatus for an internal combustion engine of the invention and the fuel injection amount control method for an internal combustion engine of the invention, when it is determined that a delay of the learning process is not permitted, the load connection state of the internal combustion engine is forced to be a specific connection state so as to satisfy the second learning condition, and therefore the learning process is preferentially executed. On the other hand, when it is determined by the third determination means that the delay of the learning process is permitted, the delay of the learning process is caused to be permitted until both the first learning condition and the second learning condition are satisfied naturally without performing any special processing for the satisfaction. Therefore, both securement of required injection amount accuracy and securement of drivability can be achieved.

Besides, according to the control system for a power unit of the invention, when the first learning condition is satisfied but the second learning condition is not satisfied while it is determined that a delay of the learning process is not permitted, the control system outputs the compulsive signal that forces the completely locked-up state of the lockup mechanism to be prohibited so as to satisfy the second learning condition, and therefore causes the learning process to be preferentially executed. On the other hand, when it is determined by the third determination means that the delay of the learning process is permitted, the control system causes delay of the learning process to be permitted until it is determined that both the first learning condition and the second learning condition are satisfied. Therefore, both securement of required injection amount accuracy and securement of drivability can be achieved.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the drawings.

Figure 1:
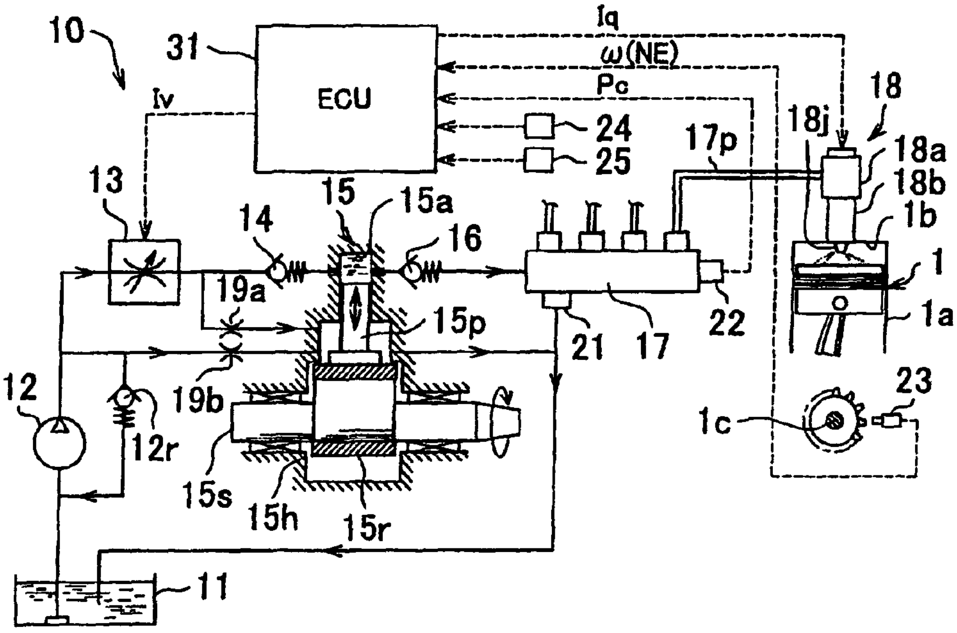
FIG. 1 is a schematic diagram of an overall construction of a fuel injection amount control apparatus for an internal combustion engine in accordance with a first embodiment of the invention, and a fuel injection system equipped with the fuel injection amount control apparatus.

FIG. 1 is a schematic diagram of an overall construction of a fuel injection amount control apparatus for an internal combustion engine in accordance with a first embodiment of the invention, and a fuel injection system equipped with the fuel injection amount control apparatus. FIGS. 2A to 2D are illustrative diagrams of the execution cycle time and the period of execution of a learning process that is executed by the fuel injection amount control apparatus for an internal combustion engine in accordance with the first embodiment. Besides, FIG. 3A is a graph showing a proportional relation between the injected amount of fuel and the generated torque in a learning injection that is executed by the fuel injection amount control apparatus in accordance with the first embodiment, and FIG. 3B is a graph showing a relation between the rise in engine rotation speed caused by the learning injection and the engine rotation speed during the learning injection.

Firstly, a construction of the first embodiment will be described.

As shown in FIG. 1, the fuel injection system of this embodiment is installed in an engine 1, that is, a multicylinder internal combustion engine, for example, a four-cylinder diesel engine (only one cylinder is shown in FIG. 1).

In this fuel injection system, the fuel pumped up from a fuel tank 11 by a feed pump 12 is adjusted by an adjustment valve 13, that is, a variable restriction element, and is sucked into a pressurizing pump 15 through a check valve 14. The high-pressure fuel pressurized by the pressurizing pump 15 is supplied through a check valve 16 to a common rail 17 capable of accumulating high pressure. From an injector 18 corresponding to a cylinder 1*a* that is undergoing the compression stroke, among a plurality of injectors 18 connected to the common rail 17, high-pressure fuel is injected into a combustion chamber 1*b* of the cylinder 1*a* at a pre-set injection timing. A known pressure limiter 21 and a fuel pressure sensor 22 are mounted on the common rail 17.

The feed pump 12 is a known low-pressure fuel pump. Besides, the adjustment valve 13 is a variable restriction element that is opened to a maximum degree of opening, for example, by restoration spring force during a non-electrified state of an internal coil, and that, during an electrified state of the internal coil, reduces the degree of opening according to the amount of electrification of the internal coil.

The pressurizing pump 15 is of a known type having a plunger 15*p* that is movable radially inward and outward, a camshaft 15*s* that drives the plunger 15*p*, and a cam ring 15*r* that is freely rotatably fitted over an eccentric cam portion of a camshaft 15*s*, within a pump housing 15*h*. Between the pump housing 15*h* and the plunger 15*p*, there is defined at least one pressurization chamber 15*a* in which suction, pressurization and discharge of fuel are performed by the reciprocating movements of the plunger 15*p*. The pressurizing pump 15 may be integrated with the feed pump 12 so as to form a fuel supply pump.

Within the pump housing 15*h* separated from the pressurization chamber 15*a* by the plunger 15*p*, not only the camshaft 15*s* and the cam ring 15*r* are housed, but also fuel from the adjustment valve 13 is supplied via an orifice 19*a* to the surrounding of those components within the housing 15*h*, and the fuel discharged from the feed pump 12 is supplied thereto via an orifice 19*b*. Then, a surplus amount of fuel within the pump housing 15*h* is returned to the fuel tank 11, together with the fuel that is supplied to the common rail 17 in excess and is discharged from the pressure limiter 21. In addition, the discharge pressure of the feed pump 12 is restricted by the relief valve 12*r* to or below the set pressure.

The check valve 14 disposed between the pressurization chamber 15*a* of the pressurizing pump 15 and the adjustment valve 13 opens when the pressure is lower on the side of the check valve 14 toward the pressurization chamber 15*a* of the pressurizing pump 15 than on the side thereof toward the adjustment valve 13, and closes when the pressure is higher on the side toward the pressurization chamber 15*a* than on the side toward the adjustment valve 13. In this manner, the check valve 14 is able to prevent the fuel sucked into the pressurization chamber 15*a* from flowing backward. Besides, the check valve 16 disposed between the pressurization chamber 15*a* of the pressurizing pump 15 and the pressure accumulation chamber (not shown) in the common rail 17 opens when the pressure is higher on the pressurization chamber 15*a* side than in the common rail 17, and closes when the pressure is lower on the pressurization chamber 15*a* side than in the common rail 17. In this manner, the check valve 16 is able to prevent the fuel discharged from the pressurization chamber 15*a* from flowing backward.

Each of the injectors 18 includes an electromagnetic valve portion 18*a* that is driven by an injection command signal Iq from an ECU 31 that is an electronic control unit, and a nozzle portion 18*b* which has at its distal end a nozzle hole portion 18*j* that is exposed in the combustion chamber 1*b* of the cylinder 1*a*, and which performs a valve opening operation so as to inject fuel from the nozzle hole portion 18*j* into the cylinder 1*a* when the electromagnetic valve portion 18*a* is electrified. Besides, the injectors 18 are provided for each cylinder of the engine 1, and are connected to the common rail 17 via high-pressure piping 17*b*. The construction of the foregoing injectors is well known, and therefore is not described herein.

When high-pressure fuel is supplied so that the rail pressure that is the pressure of fuel in the common rail 17 may exceed a pre-set upper limit pressure value, the pressure limiter 21 is able to restrict the rising rail pressure to at most the pre-set upper-limit pressure value by discharging surplus high-pressure fuel from the common rail 17.

On the other hand, the detected information from a fuel pressure sensor 22 mounted on the common rail 17 is taken in by the ECU 31 as the rail pressure, that is, the fuel pressure in the common rail 17, and is compared with a target rail pressure that is set by the ECU 31. Then, the ECU 31 changes the degree of opening of the adjustment valve 13 disposed at the fuel supply side through an electrification control so that the pressure of fuel in the common rail 17 becomes equal to the target rail pressure.

Besides the fuel pressure sensor 22, a group of various sensors are also connected to the ECU 31, including a rotation speed sensor 23 (rotation speed detection means) that detects the rotation speed ω of a crankshaft 1*c* of the engine 1, that is, the engine rotation speed, an accelerator operation amount sensor 24 that detects the amount of accelerator operation, a vehicle speed sensor 25 that detects the vehicle speed of a vehicle (not shown) in which the engine 1 is mounted, etc.

The ECU 31 is made up of, although its concrete hardware construction is not shown in the drawings, a CPU (Central Processing Unit), a ROM (Read-Only Memory), a RAM (Random Access Memory), and a backup memory formed by a non-volatile memory, and further includes an input interface circuit that includes A/D converters and the like, an output interface circuit that includes drivers and relay switches, and a constant-voltage circuit. The ECU 31, following a control program pre-stored in the ROM, and on the basis of the detected information provided by the sensor group, and while communicating with other vehicle-mounted ECU (e.g., an ECU that controls the transmission), detects the engine rotation speed (rpm) of the engine 1 from the detected information provided by the rotation speed sensor 23, and sets a target rail pressure of the common rail 17 for the time of operation of the engine 1, and calculates a fuel injection timing and a fuel injection amount commensurate with the state of operation of the engine 1, and outputs an opening adjustment signal Iv to the adjustment valve 13 (see FIG. 1), and the injection command signal Iq to the electromagnetic valve portion 18*a* of each injector 18 at appropriate timing.

Besides, the ECU 31 has a function of rotation speed detection means for detecting the engine rotation speed in cooperation with the rotation speed sensor 23, and also has functions of first determination means, second determination means, learning-purpose injection command means, performance value calculation means, correction means, third determination means, and compulsive signal output means. The ECU 31 executes a learning process, under a pre-set learning condition, that learns change in fuel injection performance that corresponds to accuracy of the actual injection amount of the injector 18 with respect to a commanded injection amount that is specifically determined by an injection command signal Iq, and corrects the commanded injection amount that is specifically determined by the injection command signal Iq according to a result of the learning. [0055] Concretely, by the function of the first determination means, the ECU 31 determines whether or not a first learning condition regarding the operation state of the engine 1 that is pre-stored in the ROM, for example, conditions (a) to (c) stated below, is satisfied. Then, by the function of the second determination means, the ECU 31 determines whether or not a second learning condition regarding the load connection state of the engine 1 pre-stored in the ROM, for example, a condition (d) stated below, is satisfied. (a) The present time is a non-injection time (e.g., the time of deceleration fuel cut, or the time of shift of speed change ratio) during which the commanded injection amount that is specifically determined by an injection command signal Iq sent to the injectors 18 is less than or equal to zero. (b) The pressure of fuel in the common rail 17 (rail pressure) is maintained within a certain range. (c) The cooling water temperature of the engine 1 is above a certain temperature. (d) The automatic transmission (not shown in FIG. 1) located at a stage rearward of the engine 1 is in a neutral-equivalent state, and the torque converter is in a slip state in which a sufficient and constant degree of slippage occurs.

Incidentally, satisfaction of the learning condition may also be determined on the basis of signals from other environmental condition-detecting sensors (e.g., temperature sensors disposed at various sites, pressure sensors, speed sensors), or sensors that detect the input of driver's operations (e.g., an accelerator operation amount sensor). Besides, in the case where the engine 1 is equipped with any one of an EGR device (exhaust gas recirculation device) that refluxes a portion of exhaust gas to the intake side, a diesel throttle that throttles the intake passageway, and a variable turbo-supercharger that has a variable nozzle that disposed on the exhaust passageway, the degree of opening of the EGR valve, the degree of opening of the diesel throttle, or the degree of opening of the variable turbo-supercharger can be used as a learning condition.

Besides, when by the functions of the first determination means and the second determination means, it is determined that both the first learning condition and the second learning condition are satisfied, the ECU 31 functions as the learning-purpose injection command means, and commands an injector 18 to perform the learning-purpose injection with a commanded injection amount that is pre-set in the ROM. The commanded injection amount of the learning-purpose injection corresponds to the commanded injection amount that is used, for example, when a pilot injection is executed prior to the main injection during an ordinary operation of the engine 1.

Furthermore, when the learning-purpose injection is carried out with respect to the combustion chamber 1*b* of a specific cylinder during its compression stroke by the injector 18 according to the command from the learning-purpose injection command means, the ECU 31, by the function as the performance value calculation means, calculates the amount of rise (amount of change) in the rotation speed of the engine 1 that is caused by the learning-purpose injection, on the basis of the detected information from the rotation speed sensor 23, and then calculates a torque-proportional quantity (injection performance value) that corresponds to the actual injection amount of the injector 18 on the basis of the amount of rise in rotation speed.

In the engine 1, which is a diesel engine, there is generally a relation in which the amount of fuel injection [$mm^3$/st] and the generated torque [Nm] caused by the fuel injection are proportional to each other within a range of relatively small injection amounts as shown in FIG. 3A. Besides, due to the characteristic of the engine 1, a relation between the amount of rise in the rotation speed caused by the learning-purpose injection of very small amount and the engine rotation speed occurring at the time of the learning injection can also be pre-stored in the ROM as data that shows a correspondence relation as shown in FIG. 3B. Therefore, for example, during an operation state in which no fuel injection is performed and the rotation speed of the engine 1 gradually declines, that is, in an operation state of no fuel injection in which the commanded injection amount for the injector 18 is zero or less, a single-shot learning-purpose injection of very small amount (hereinafter, also referred to as "single-shot injection") is executed, and the multiplication product of the amount of rise in the engine rotation speed caused by the single-shot injection and the engine rotation speed occurring at the time of execution of the single-shot injection is calculated as a torque-proportional quantity that is proportional to the generated torque, beforehand. Then, by calculating the generated torque from the torque-proportional quantity, an actual injection amount can be estimated.

After estimating the actual injection amount of the injector 18 that is specifically determined by the torque-proportional quantity in the foregoing manner, the ECU 31, by its function as the correction means, sets a difference between the actual injection amount and the commanded injection amount that is commanded to the injector 18 as an amount of change in the injection amount that is commensurate with the injection accuracy decline rate qe (actual injection amount/commanded injection amount), and corrects the injection command signal Iq at the time of ordinary operation by a correction amount that corresponds to the amount of change, so that the target injection amount and the actual injection amount are made accurately equal.

Figures 2A, 2B, 2C, 2D:
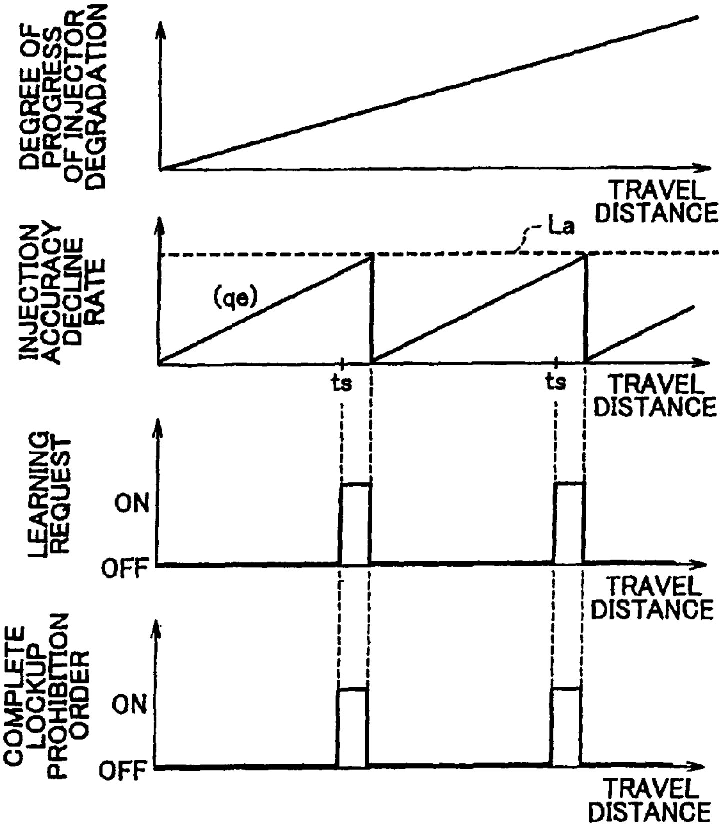
FIGS. 2A, 2B, 2C and 2D are illustrative diagrams of the execution cycle time and the period of the execution of a learning process that is executed by the fuel injection amount control apparatus for an internal combustion engine in accordance with the first embodiment.
Figure 3A:
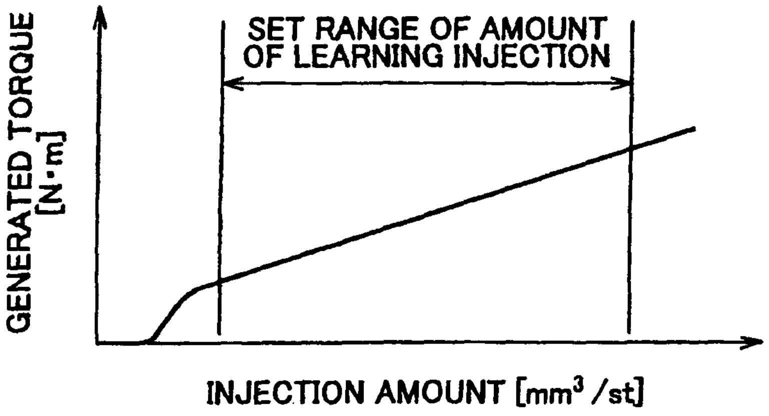
FIG. 3A is a graph showing a proportional relation between the injected amount of fuel and the generated torque in a learning injection that is executed by the fuel injection amount control apparatus in accordance with the first embodiment.
Figure 3B:
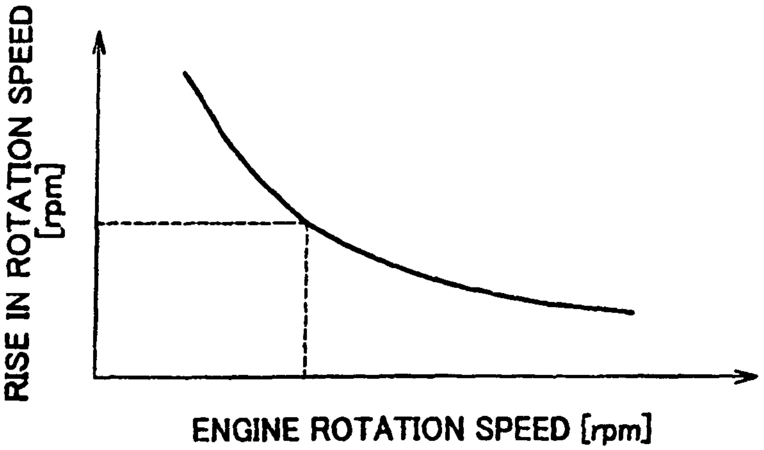
FIG. 3B is a graph showing a relation between the rise in engine rotation speed caused by the learning injection and the engine rotation speed during the learning injection.

Meanwhile, the ECU 31, by a novel function as the third determination means, determines whether or not a delay equal to or longer than a certain length of time which occurs in the learning process is permitted, on the basis of whether or not the learning process, despite occurrence of the delay, can be completed before the decline rate qe of the injection accuracy of the injector 18 reaches a permissible limit value La (see FIG. 2B).

If, by the function of the third determination means, it is determined that the delay of the learning process is not permitted, then the ECU 31, by a function as compulsive signal output means, outputs a compulsive signal that forces the load connection state of the engine 1 to be a specific connection state (or change to a specific connection state) so that the second learning condition is satisfied, for example, outputs a complete-lockup prohibition order (see FIG. 2D). The compulsive signal herein is, for example, a signal which the ECU 31, by the function of the compulsive signal output means, outputs to another ECU that controls the lockup mechanism-equipped automatic transmission provided at a stage rearward of the engine 1, and which commands, as high-level command means, that the second learning condition concerned with the load connection state of the engine 1, for example, the foregoing condition (d), be compulsorily satisfied. Besides, the certain length of time that is mentioned in the expression of a delay equal to or longer than a certain length of time is a period of time that is sufficiently longer than the repetition cycle time of the determination performed by the third determination means, and, for example, a period of time during which it is highly possible that the first and second learning conditions will be satisfied during the ordinary operation state at least a certain probability. Furthermore, the complete lockup, although not shown in detail, is a state in which the pump impeller and the turbine runner of the torque converter are fastened to each other so as to be capable of power transmission without slippage via a lockup clutch.

The foregoing functions of the ECU 31 make it possible that, when the ECU 31 as the third determination means determines that a delay of the learning process is permitted, the delay of the learning process will be permitted until it is determined that both the first learning condition and the second learning condition are satisfied.

Besides, the ECU 31, as the third determination means, performs determination as follows. That is, a timing is at which the delay of the learning process is not permitted in order to complete the learning process immediately before the amount of decline in the injection amount accuracy reaches the permissible limit value La, that is, the amount by which the torque-proportional value calculated as described above gradually decreases due to degradation of the injector 18, as the amount of decline in the injection amount accuracy gradually increases as shown in FIG. 2B, is determined on the basis of the accumulated information that corresponds to the accumulated time of use of the injector 18, for example, the information regarding the accumulated value of the travel distance accumulated from the time point of start of use of the injector 18 or the time point of completion of the immediately previous learning process.

Incidentally, in this embodiment, since the lockup mechanism-equipped automatic transmission is installed at a stage rearward of the engine 1, a certain load needed for the torque converter to produce slippage is always connected to the automatic transmission even when, during the neutral state of the automatic transmission, the lockup mechanism is put into a released (disengaged) state or a slip state with a large slip rate. The slip state in which the load is constant is referred to as "specific connection state".

Next, operation of the embodiment will be described.

Figure 4A:
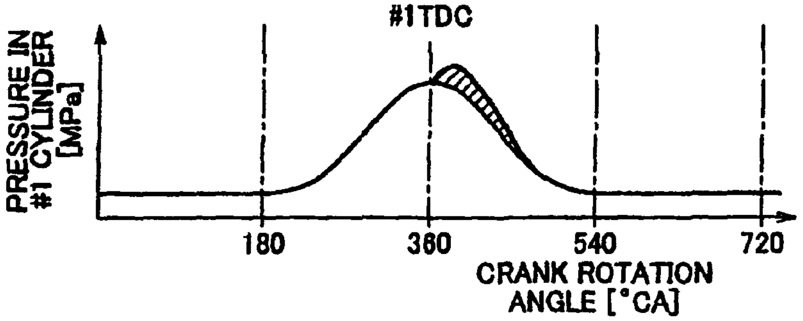
FIGS. 4A to 4C are illustrative diagrams of actions performed at the time of the learning injection, showing changes in the in-cylinder pressure, the generated torque, and the engine rotation speed before, during and after execution of the learning injection in the fuel injection amount control apparatus for an internal combustion engine in accordance with the first embodiment.
Figure 4B:
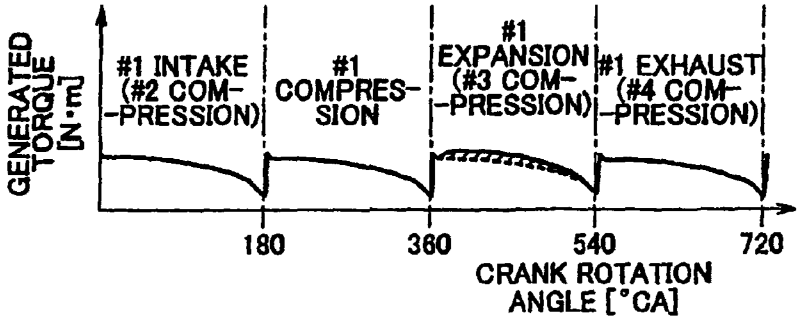
Figure 4C:
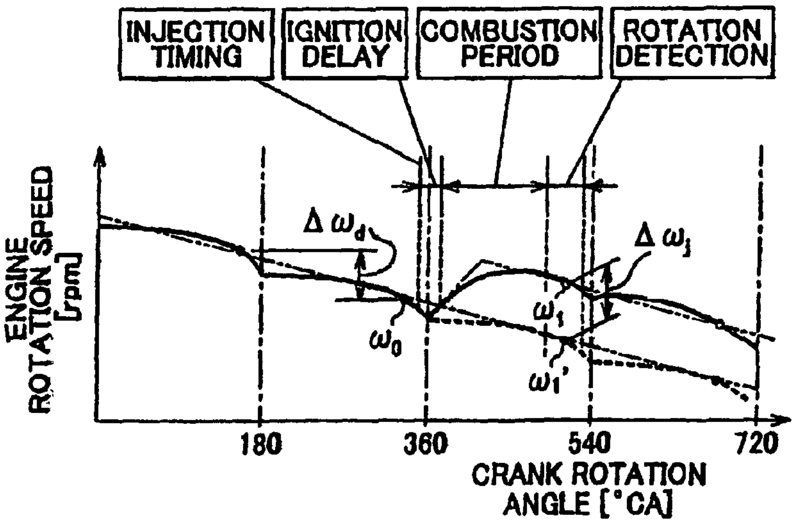
Figure 5:
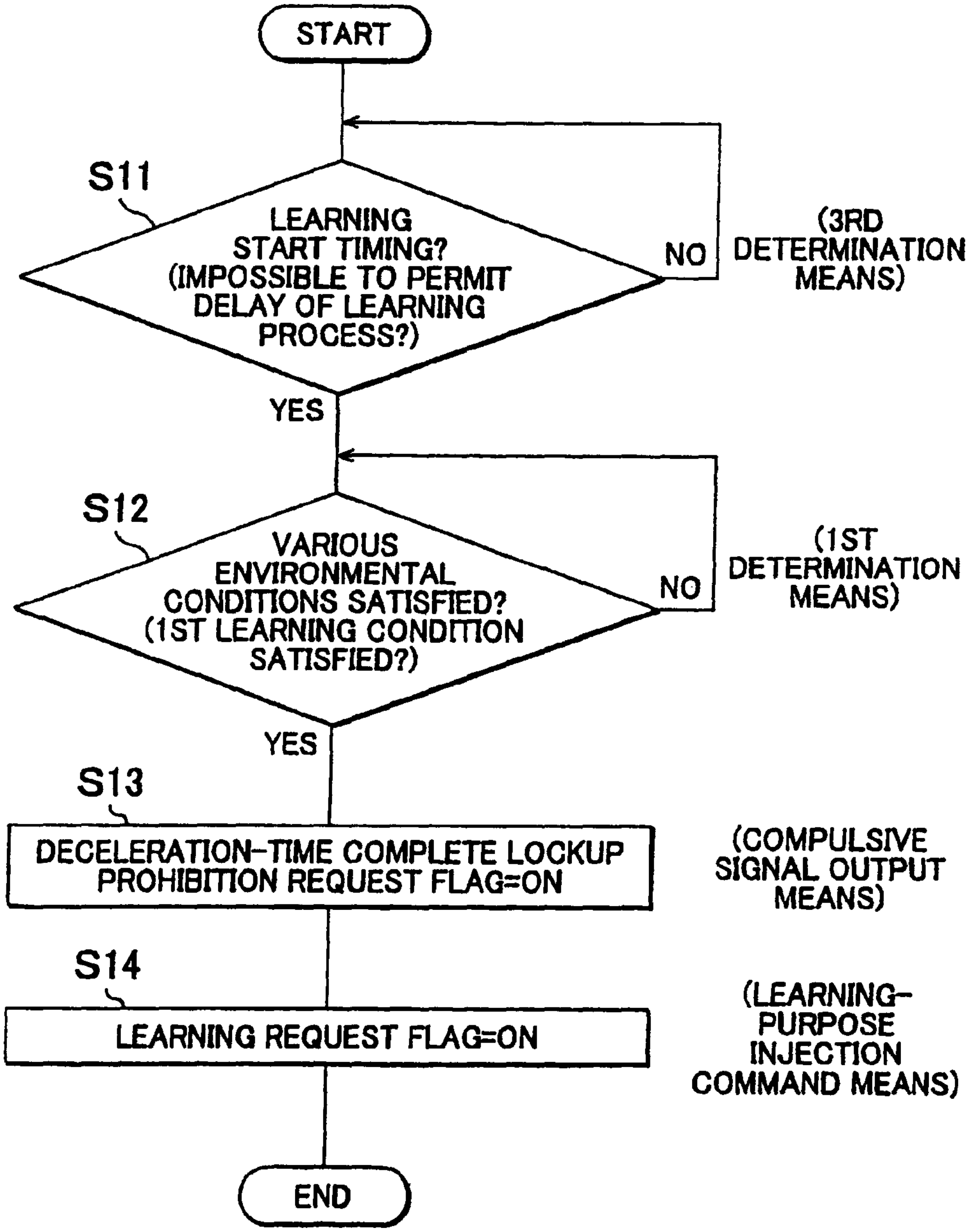
FIG. 5 is a flowchart showing a process of setting a learning request flag and a complete lockup prohibition flag which is repeatedly executed by an engine-side ECU in the fuel injection amount control apparatus for an internal combustion engine in accordance with the first embodiment.

FIGS. 4A to 4C are illustrative diagrams of actions performed at the time of the learning injection, showing changes in the in-cylinder pressure, the generated torque, and the engine rotation speed before, during and after execution of the learning injection. FIG. 5 is a flowchart showing a process of setting a learning request flag and a complete lockup prohibition flag which is repeatedly executed by an engine-side ECU, and FIG. 6 is a flowchart of a learning and injection amount correction process that is repeatedly executed by the engine-side ECU.

Figure 6:
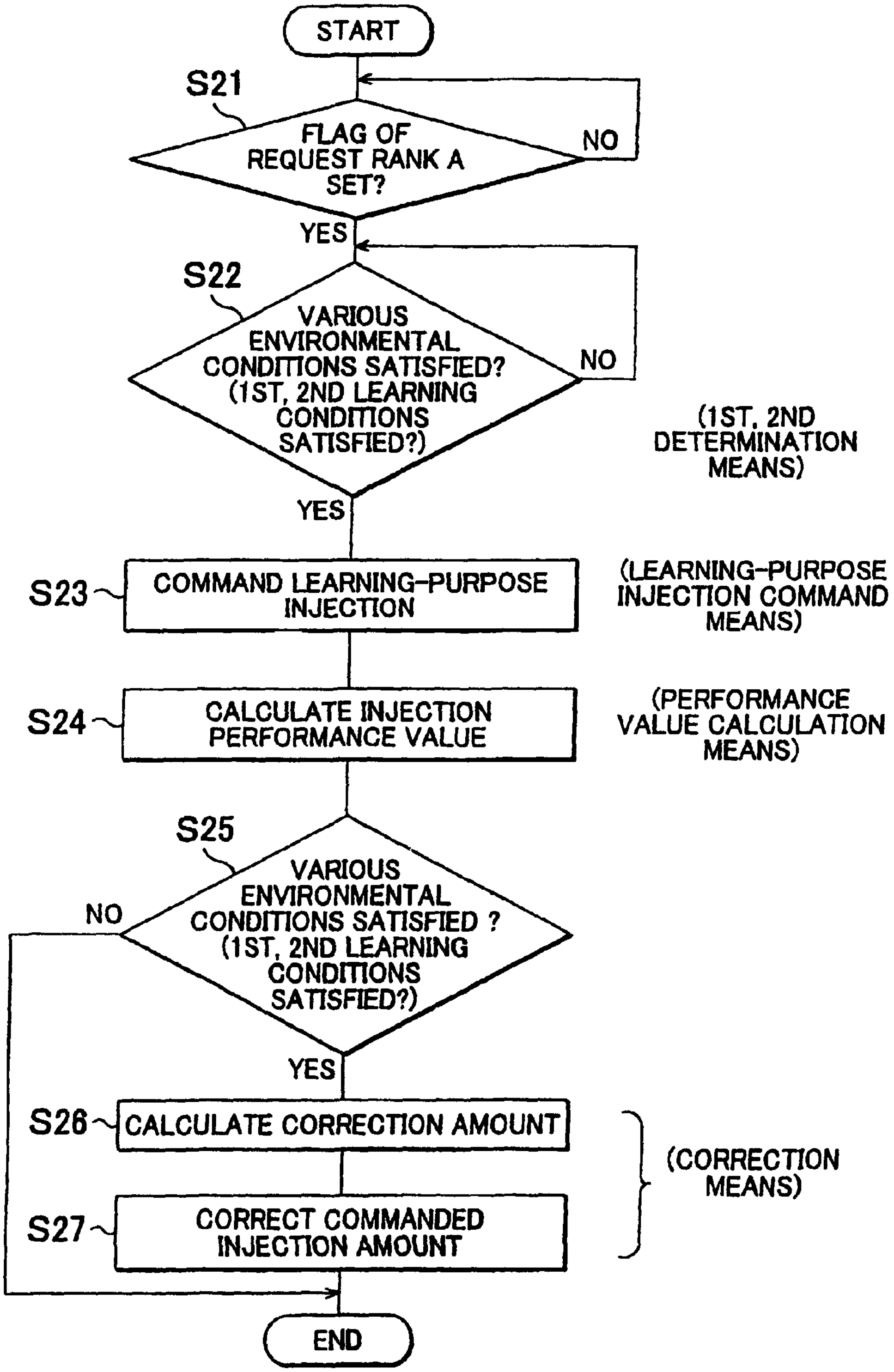
FIG. 6 is a flowchart of a learning and injection amount correction process that is repeatedly executed by the engine-side ECU of the fuel injection amount control apparatus for an internal combustion engine in accordance with the first embodiment.

During operation of the engine 1, the ECU 31 repeatedly executes processes as shown in FIGS. 5 and 6.

Incidentally, the ECU 31 takes the operation state of the engine 1 and the load connection state thereof, which will be used for determining whether the first and second learning conditions are satisfied, (e.g., the slip state equivalent to the neutral state of the automatic transmission, the operation state of the lockup mechanism, or the operation state of a further accessory load), and information regarding accumulated value of the travel distance accumulated from the time point of start of use of the injector 18, or the time point of completion of the immediately previous learning process, into specific memory regions in the RAM used for the learning process, every certain time following the starting of the engine 1. Besides, the ECU 31 takes in the setting information that determines the learning interval at the starting of the engine 1.

In the setting process for the learning request flag and the complete lockup prohibition flag shown in FIG. 5, firstly the ECU 31, by its novel function as the third determination means, determines whether or not the accumulated value of the travel distance from the time point of start of use, or the time point of completion of the immediately previous learning process, has reached a learning start timing is that corresponds to the set value of a learning interval (step S11, which is a determination step carried out by the third determination means). Thus, it is determined whether or not a delay equal to or longer than a certain length of time which occurs in the learning process by postponing the present learning process is permitted, on the basis of whether or not the learning process, despite occurrence of the delay, can be completed before the decline rate qe of the injection accuracy of the injector 18 (see FIG. 2B) reaches the pre-set permissible limit value La.

If it is not determined that the learning start timing has arrived (if NO at step S11), substantially the same determination process is repeatedly executed every certain time until the learning start timing arrives.

On the other hand, if it is determined that the learning start timing has arrived (if YES at step S11), it is then determined whether or not, for example, the first learning condition, as various environmental conditions that serve as a prerequisite for execution of the learning process, is satisfied (step S12, which is a determination step carried out by the first determination means). Specifically, it is determined whether or not the conditions that (a) the present time is a non-injection time, for example, the time of deceleration fuel cut, during which the commanded injection amount for the injector 18 is less than or equal to zero, (b) the pressure of fuel in the common rail 17 (rail pressure) is maintained within a certain range, and (c) the cooling water temperature of the engine 1 is above a certain temperature, are satisfied.

If any one of the foregoing conditions (a) to (c) of the first learning condition is not satisfied (if NO at step S12), the determination process regarding satisfaction of the first learning condition is executed every certain time until all the learning conditions (a) to (c) are satisfied.

On the other hand, if it is determined that the first learning condition is satisfied (if YES at step S12), the ECU 31 then makes valid (turns on) a request flag that prohibits the complete lockup action of the lockup mechanism at the time of learning process, for example, at the time of deceleration, whereby a deceleration-time complete-lockup prohibition order is output as a compulsive signal to another ECU that controls the automatic transmission (step S13, which is a signal outputting step carried out by the compulsive signal output means). After that, the learning request flag is set (step S14, which is a learning requesting step carried out by the learning-purpose injection command means). Therefore, at the time of learning, the complete lockup on the automatic transmission side is prohibited, and the lockup mechanism is caused to be in a released state or a slip state with a large slip rate.

After the learning request flag is set, the setting (on-state) of the learning request flag is recognized in the learning process shown in FIG. 6 (step S21), and then it is checked whether or not the first and second learning conditions are satisfied (step S22, which is a determination step carried out by the first and second determination means). Specifically, it is determined whether or not the condition (d) that the automatic transmission (not shown in FIG. 1) located at a stage rearward of the engine 1 is in a neutral-equivalent state, and the torque converter is in a slip state in which a sufficient and constant degree of slippage occurs, in addition to the learning conditions (a) to (c), is satisfied. Then, if the learning conditions (a) to (d) are all satisfied, the ECU 31 outputs a learning-purpose injection command signal that commands that the injector 18 of a specific cylinder perform a learning-purpose injection of a commanded injection amount that is equivalent to the amount of the pilot injection performed during the ordinary operation (step S23, which is an injection commanding step carried out by the learning-purpose injection command means).

At this time, as shown in FIGS. 4B and 4C, for example, during a later period of the compression stroke of the first cylinder (shown by #1 in FIG. 4B), which is the specific cylinder, the injector 18 receiving the learning-purpose injection command performs the learning-purpose injection into the combustion chamber 1*b* of the first cylinder 1*a* at an ignition timing immediately preceding the crank angle of 360° CA, which is the top dead center (#1TDC in FIG. 4A). Then, after an ignition delay, the fuel burns, and an engine rotation speed ω1 [rpm] that is the rotation speed of the crankshaft 1*c* of the engine 1 is detected within a rotation detection period that starts at a vicinity of a time point at which the exhaust valve is opened during an ending period of the combustion period. Incidentally, the fluctuations of the generated torque shown in FIG. 4B are caused solely by the pumping loss of each cylinder 1*a* of the engine 1, and a hatched portion in FIG. 4B indicates the amount of increase in the generated torque which is brought about by the learning-purpose injection.

Next, the amount of rise (amount of change) in the rotation speed [rpm] of the engine 1 that is caused by the learning-purpose injection is calculated on the basis of the detected information from the rotation speed sensor 23, and an injection performance value (torque-proportional quantity) that corresponds to the actual injection amount of the injector 18 is calculated on the basis of the amount of rise in the rotation speed (step S24, which is a performance value calculating step carried out by the performance value calculation means).

Concretely, in a calculation process for this injection performance value, the engine rotation speed is calculated a plurality of times every certain time period on the basis of the detected pulse information from the rotation speed sensor 23 during the non-injection state (e.g., the deceleration fuel-cut state), and the amount of rotation speed fluctuation (amount of decrease shown by Δωd in FIG. 4C) occurring in every certain time period in the engine rotation speed that gradually decreases during the non-injection state is calculated. Then, as shown in FIG. 4C, an engine rotation speed ω1' immediately following the learning-purpose injection timing which is estimated in the case where the learning-purpose injection is not performed at the learning-purpose injection timing is calculated. Then, the amount of rise Δωj in rotation speed between the engine rotation speed ω1' in the case where the learning-purpose injection is not performed and the engine rotation speed ω1 in the case where the learning-purpose injection is performed at the learning-purpose injection timing is calculated. Next, an injection performance value is calculated as a torque-proportional quantity that is a multiplication product of the amount of rise Δωj in rotation speed and the engine rotation speed ω0 occurring at the time of the learning-purpose injection. Incidentally, as for the calculation of the amount of rise Δωj in rotation speed, it is appropriate that the specific cylinder in which the learning process is executed be set as each one of the cylinders 1*a* of the engine 1, and the amount of rises Δωj in rotation speed in the cylinders 1*a* be calculated, and an average value thereof be calculated.

After the calculation of the injection performance value (step S24) ends, it is re-checked whether or not the first and second learning conditions are satisfied (step S25, which is a determination step carried out by the first and second determination means). If the first and second learning conditions are satisfied, then a correction amount corresponding to the decline rate qe of the injection accuracy that is a difference between the learning injection-time actual injection amount of the injector 18 which corresponds to the torque-proportional quantity (the generated torque ($k \cdot \Delta\omega j \cdot \omega_0$ where k is a factor of proportionality) calculated from the torque proportional quantity) and the commanded injection amount that is commanded to the injector 18 is calculated from the relation shown in FIG. 3A, and the calculated correction amount is stored until the next time the injection performance value calculated in the present cycle is updated (step S26, which is a correction step carried out by the correction means). Then, on the basis of the calculated correction amount, the injection command signal Iq at the time of ordinary operation is corrected so that the actual injection amount and the target injection amount are made highly accurately equal to each other (step S27). Incidentally, in the case where the first and second learning conditions are not satisfied immediately after the injection performance value is calculated (if NO at step S25), the injection performance value calculated in the present cycle is discarded, and the present execution of the process ends.

Thus, in this embodiment, when it is determined that a delay of the learning process is not permitted, a compulsive signal that forces the load connection state of the engine 1 to be a specific connection state (or change to a specific connection state), for example, a deceleration-time complete lockup prohibition order that prohibits the complete lockup of the lockup mechanism, is output so as to satisfy the second learning condition at the time of determination as to whether or not to perform the learning process. Therefore, the learning process is preferentially executed, so that a required fuel injection accuracy is secured. On the other hand, when by the third determination means it is determined that a delay of the learning process is permitted, the delay of the learning process is permitted until it is determined that both the first learning condition and the second learning condition are satisfied without performing any special processing for the satisfaction. Thus, good drivability is secured. Therefore, both securement of drivability and securement of injection amount accuracy of the injectors can be achieved.

Besides, the learning process can be certainly completed immediately before the decline rate qe of the injection accuracy of the injector 18 reaches the permissible limit value La, and the frequency of the learning process's restricting the load connection state of the engine 1, for example, restricting the complete lockup of the lockup mechanism at the time of deceleration, can be sufficiently restrained, so that drivability can be secured.

Figure 7:
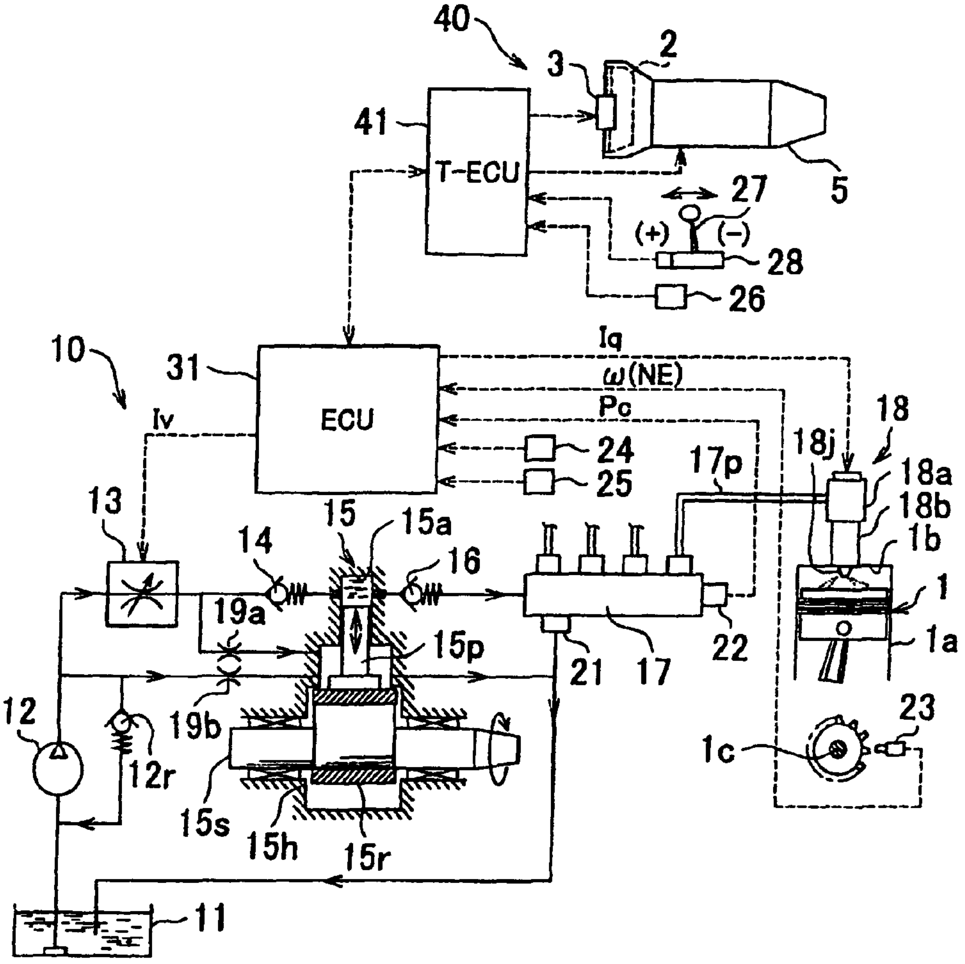
FIG. 7 is a schematic diagram of an overall construction of a control system for a power unit equipped with a fuel injection amount control apparatus for an internal combustion engine in accordance with a second embodiment of the invention.

FIG. 7 is a schematic diagram of an overall construction of a control system for a power unit equipped with a fuel injection amount control apparatus for an internal combustion engine in accordance with a second embodiment of the invention. In this embodiment, the invention is applied to a control system for a power unit of a vehicle in which an automatic transmission with a manual shift mode is mounted (an automatic-transmission vehicle). FIGS. 8A to 8E are illustrative diagrams showing the execution timing and the period of execution of a learning process that is executed by the fuel injection amount control apparatus for an internal combustion engine in accordance with the second embodiment. Besides, FIG. 9 is a flowchart showing a setting process for a learning request flag and a complete lockup prohibition flag which is executed by the control system for a power unit in accordance with the second embodiment. Incidentally, the fuel injection amount control apparatus in the second embodiment has constructions that are substantially the same as or similar to those in the foregoing first embodiment. Such constructions are represented by the same reference characters as those representing the corresponding construction elements in FIG. 1, and constructions of the second embodiment different from those of the first embodiment will be described below.

As shown in FIG. 7, this embodiment is a control system that controls a power unit that includes an engine 1 mounted in a vehicle, and an automatic transmission 5 (power transmission apparatus) that has a torque converter 2 that transmits power from the engine 1, and a lockup mechanism 3 that locks up the torque converter 2. The control system includes: a fuel injection amount control apparatus 10 that has an ECU 31 that generates an injection command signal Iq that commands an injector 18 of the engine 1 to inject fuel, and that learns change in the fuel injection performance of the injector 18 under a pre-set learning condition, and that corrects the injection command signal Iq according to a result of the learning; and a lockup control apparatus 40 that has a transmission controlling ECU (hereinafter, referred to as "T-ECU") 41 that controls operation of the automatic transmission 5 (that includes the torque converter 2, and the lockup mechanism 3).

The engine 1 is designed so that the fuel injection during the compression stroke of each injector 18 is injected in a plurality of divided injection operations that include very-small-amount injections, and a learning-purpose injection is executed with a commanded injection amount that is similar to the amount of any one of the divided very-small injections, for example, the amount of a pilot injection performed in the vicinity of the piston top dead center of the engine 1.

The lockup mechanism 3 is usually designed so that the lockup mechanism 3 is controlled to lock up, depending on whether or not the state of operation specifically determined by the degree of throttle opening of the engine 1 and the vehicle speed is within a lockup region that is set beforehand in a lockup graph, and therefore a lockup clutch of the lockup mechanism 3 is engaged, for example, when the vehicle runs at high speed, or when the vehicle is decelerated at least a certain deceleration, or when the vehicle is accelerated at least a certain acceleration, or the like. Then, due to the engagement of the lockup clutch, the pump impeller (not shown) and the turbine runner (not shown) of the torque converter 2 are mechanically directly or rigidly linked together via the lockup clutch so as to be able to transmit power without slippage. Besides, a slip control can also be performed by half-engaging the lockup clutch. Specifically, the engagement hydraulic pressure of the lockup clutch can be feedback-controlled so that the slip rotation speed that is a difference between the turbine rotation speed of the torque converter and the engine rotation speed remains at a target rotation speed.

The automatic transmission 5 is a multi-speed transmission equipped with a so-called manual shift function. The automatic transmission 5 has in a vehicle cabin a mode change switch 26 that is moved to select one of a plurality of travel modes, for example, an automatic shift mode and a manual shift mode, according to, for example, a driver's desire, a shift-select lever 27 capable of speed-shifting lever movements in the manual shift mode including the switching operation of the mode change switch 26 and capable of range-selecting lever movements in the automatic shift mode, and a manual shift operation detection switch 28 that, when the shift-select lever 27 is moved within a lever movement region of the manual shift mode, for example, detects a movement of the shift-select lever 27 to one side in that movement region as an upshift request operation, and detects a movement thereof to another side in the movement region as a downshift request operation.

The mode change switch 26 and the manual shift operation detection switch 28, together with a T-ECU 41 that controls the operations of the automatic transmission 5, constitute the lockup control apparatus 40. This T-ECU 41 cooperates with the ECU 31 of the fuel injection amount control apparatus 10 so that during the manual shift mode, a fuel supply state of the engine 1 and the engagement states of the friction engagement elements in the automatic transmission 5 as well as a combination of speed change ratios before and after the speed shift, etc. are set according to the manual shift operation input so as to achieve acceleration or deceleration that the driver should feel due to the driver's shift operation during a completely locked-up state of the lockup mechanism 3.

As in the case of the first embodiment, the ECU 31 of the fuel injection amount control apparatus 10 has: a function of rotation speed detection means for detecting the engine rotation speed of the engine 1 in cooperation with the rotation speed sensor 23; a function of first determination means for determining whether or not a first learning condition regarding the operation state of the engine 1, for example, the foregoing conditions (a) to (c), is satisfied, that is, whether or not the present time is a non-injection time when the commanded injection amount specifically determined by the injection command signal Iq for the injector 18 is zero or less, and the rail pressure is kept within a certain range, and the cooling water temperature of the engine 1 is above a certain temperature; and a function of second determination means for determining whether or not a second learning condition regarding the state of operation of the lockup mechanism 3, for example, a conditions substantially the same as the foregoing condition (d) is satisfied, that is, whether or not the automatic transmission 5 is in a neutral-equivalent state and the torque converter 2 is in a slip state in which a sufficient constant slip occurs.

The ECU 31 also has: a function of learning-purpose injection command means for ordering the injector 18 a learning-purpose injection with a pre-set commanded injection amount when it is determined that the first learning condition and the second learning condition are both satisfied; a function of performance value calculation means for calculating an amount of change in the engine rotation speed of the engine 1 caused by the learning-purpose injection on the basis of detected information from the rotation speed detection means when the learning-purpose injection is carried out by the injector 18 according to the command from the learning-purpose injection command means, and for calculating an injection performance value (the foregoing torque-proportional value in the first embodiment) that corresponds to the actual injection amount of the injector 18 on the basis of the calculated amount of change; and a function of correction means for correcting the injection command signal Iq according to a difference between the actual injection amount of the injector 18 specifically determined from the injection performance value and the commanded injection amount that is commanded to the injector 18.

Figures 8A, 8B, 8C, 8D, 8E:
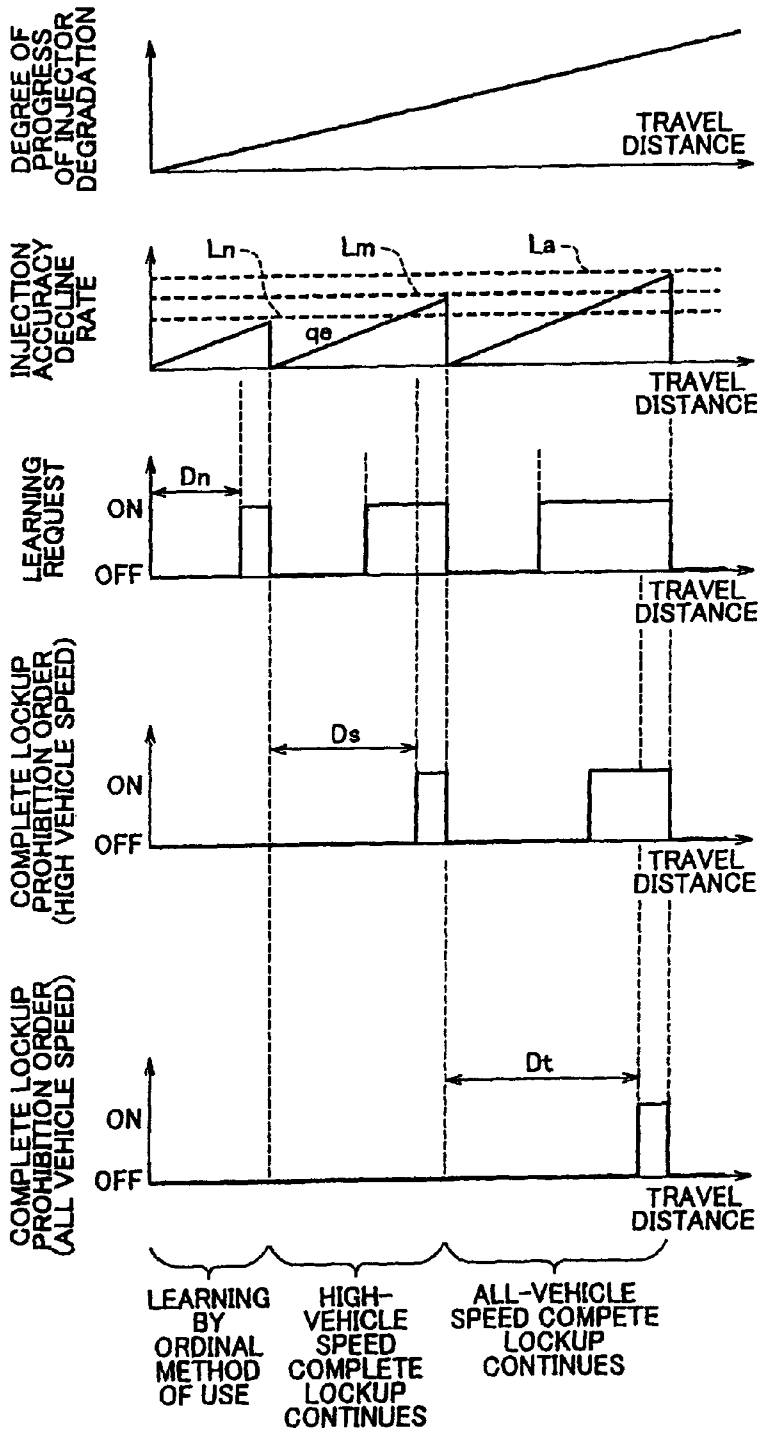
FIGS. 8A to 8E are illustrative diagrams showing the execution timing and the period of execution of a learning process that is executed by the fuel injection amount control apparatus for an internal combustion engine in accordance with the second embodiment.
Figure 9:
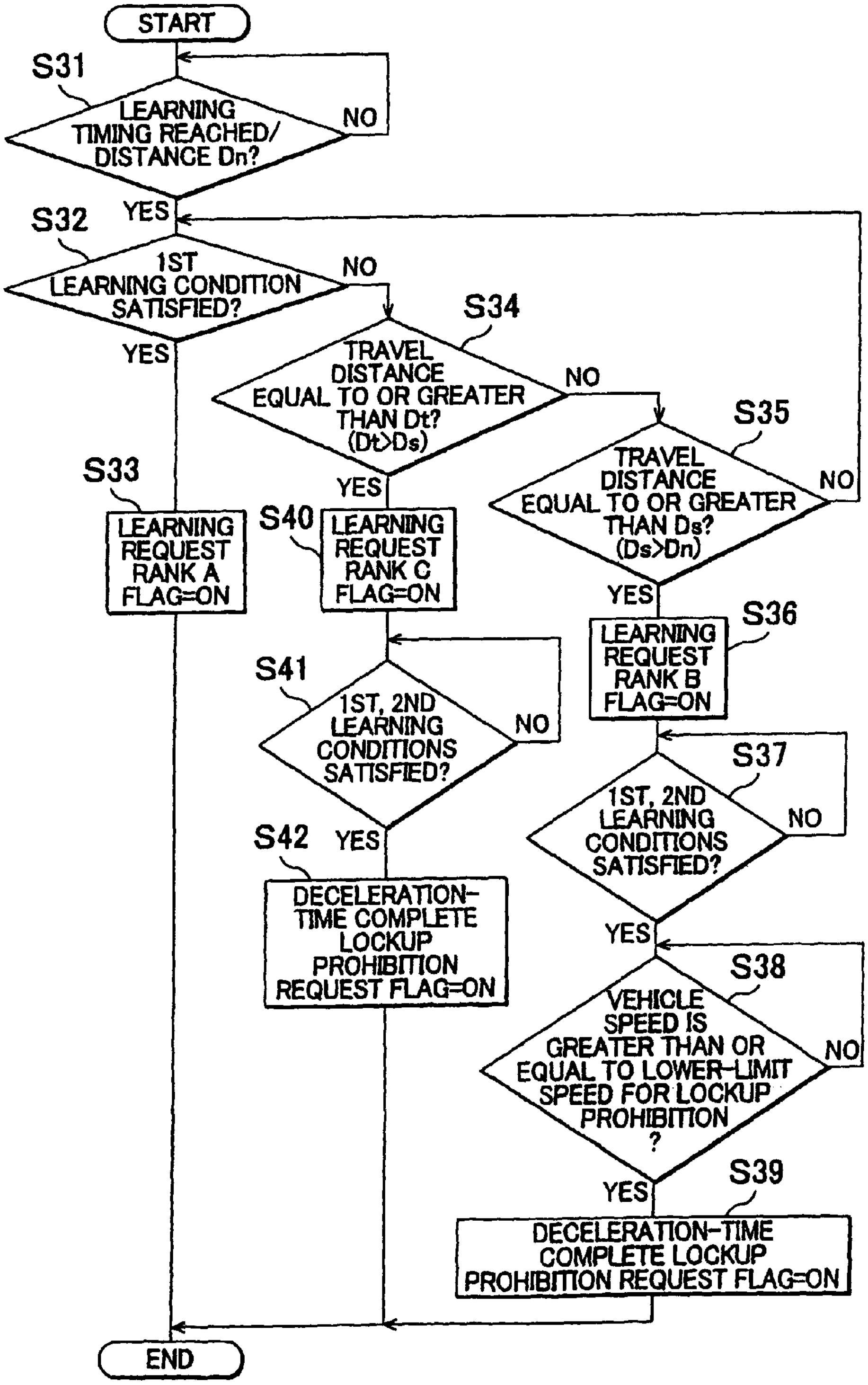
FIG. 9 is a flowchart showing a setting process for a learning request flag and a complete lockup prohibition flag which is executed by the control system for a power unit in accordance with the second embodiment.
Figure 10A:
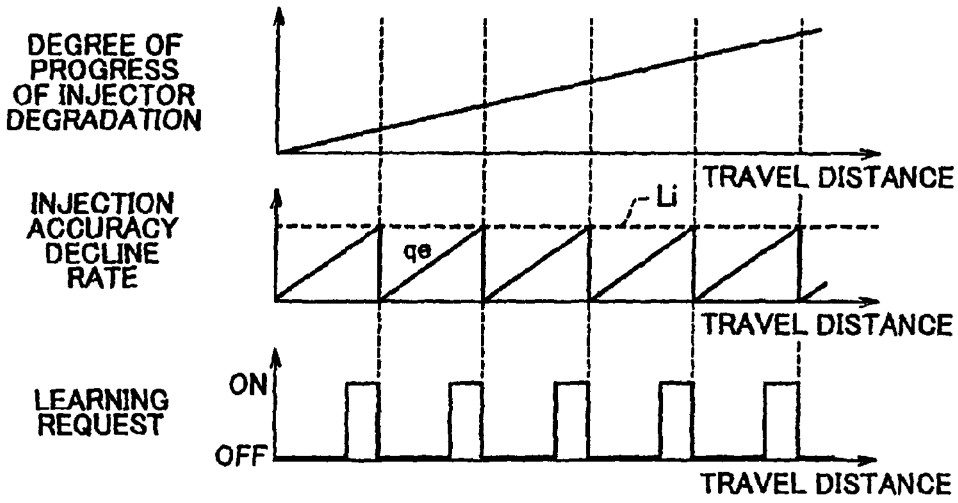
FIG. 10A RELATED ART
FIGS. 10A and 10B are diagrams for describing problems of the learning process in accordance with the related art.
Figure 10B:
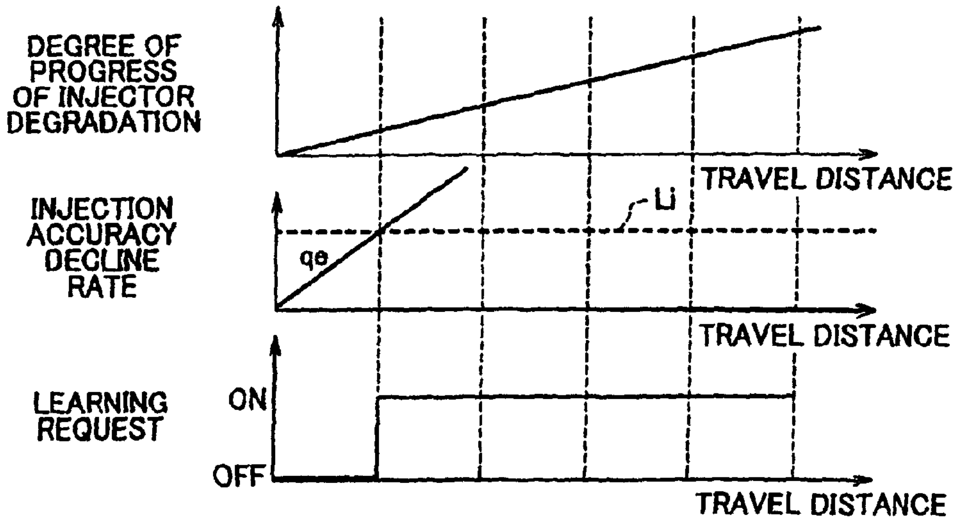
FIG. 10B RELATED ART

The ECU 31 further has: a function of third determination means for determining whether or not a delay equal to or longer than a certain length of time which occurs in the learning process is permitted on the basis of whether or not the learning process, despite occurrence of the delay, can be completed before the fuel injection performance of the injector 18 reaches a pre-set permissible limit value, for example, before the travel distance of the vehicle reaches a travel distance tf at which the injection accuracy decline rate qe reaches a permissible limit value La as shown in FIG. 8B; and a function of compulsive signal output means for setting, when it is determined by the function of the first determination means that the first learning condition is satisfied but it is determined by the function of the second determination means that the second learning condition is not satisfied in the case where it is determined by the function of the third determination means that the delay of the learning process is not permitted, a flag of a deceleration-time complete-lockup prohibition order that forces the prohibition of the completely locked-up state of the lockup mechanism 3 so that the second learning condition is satisfied, and for outputting a compulsive signal corresponding to the set flag to the T-ECU 41 of the lockup control apparatus 40. Incidentally, the aforementioned prohibition of the completely locked-up state at the time of deceleration refers to prohibition of the complete lockup executed during the learning process.

The T-ECU 41 constituting a portion of the lockup control apparatus 40, when having input a deceleration-time complete lockup prohibition signal, that is, a compulsive signal from the ECU 31 of the fuel injection amount control apparatus 10, restricts the action of the lockup mechanism 3 within such a range that the completely locked-up state thereof is not brought about, only during the learning process time during which the prohibition signal is input.

A construction of this embodiment is that, when the ECU 31 as the third determination means determines that a delay of the learning process is permitted, the delay of the learning process is permitted until it is determined that both the first learning condition and the second learning condition are satisfied, without performing any special processing for the satisfaction, even during a vehicle travel mode with less opportunities of learning.

In addition to the foregoing functions, the ECU 31 and the T-ECU 41 have: a function of action mode determination means for determining whether or not, among a plurality of action modes regarding the loads that are connected to the engine 1, a first action mode of changing the action of the lockup mechanism 3 between a non-constraint state (a specific connection state) in which the action of the lockup mechanism 3 is not constrained to the completely locked-up state and a constrained state (another state) in which the action of the lockup mechanism 3 is constrained to the completely locked-up state according to the state of travel of the vehicle has been set; and a function of fourth determination means for determining whether or not a delay equal to or longer than a certain length of time which occurs in the learning process is permitted on the basis of whether or not, despite occurrence of the delay, the fuel injection performance of the injector 18 can be kept within a specific range of fuel injection performance that is better than a permissible limit value.

The aforementioned first action mode is, for example, a high-vehicle-speed-time complete lockup mode in which the complete lockup mode is entered when the vehicle is traveling at a high speed equal to or higher than a certain vehicle speed. During the first action mode, when the vehicle travels at or above the certain vehicle speed, the action of the lockup mechanism 3 is constrained to the completely locked-up state. On the other hand, when the vehicle travels below the certain vehicle speed during the first action mode, the action of the lockup mechanism 3 is not constrained to the completely locked-up state, but is allowed to be in the slip state or the released state. In this embodiment, this mode is set by the ECU 31 and the T-ECU 41 according to the state of travel of the vehicle.

The specific range of fuel injection performance of the injector 18 which is better than the permissible limit value is, for example, a range thereof in which the injection amount accuracy decline rate (actual injection amount/commanded injection amount) is below an accuracy line Lm in FIG. 8B, and in which a relatively good fuel injection amount control accuracy can be maintained in comparison with the case where the decline rate is in the vicinity of the permissible limit value La.

The ECU 31 and the T-ECU 41 as the fourth determination means determine that the fuel injection performance of the injector 18 can be kept within the specific range (below the accuracy line Lm) of fuel injection performance in which the injection accuracy decline rate is better than the permissible limit value La even if a delay equal to or longer than a certain length of time occurs in the learning process, and therefore determine that the delay of the learning process is permitted, until the accumulated value of travel distance of the vehicle accumulated from the time point of start of use of the injector or from the time of completion of the immediately previous learning process (the time at which a flag of a request rank C is set and which is near the foregoing time of completion of the immediately previous learning process, in a flow of operation described below) reaches a distance Ds. When the accumulated value of travel distance reaches the distance Ds, the ECU 31 and the T-ECU 41 determine that the fuel injection performance of the injector 18 cannot be kept within the specific range of fuel injection performance that is better than the permissible limit value La, and therefore determine that the delay of the learning process is not permitted.

The ECU 31 as the compulsive signal output means outputs a compulsive signal to the T-ECU 41 (sets a flag for requesting the prohibition of deceleration-time complete lockup when the vehicle speed is higher than or equal to a upper-limit vehicle speed for lockup prohibition described below), if it is determined by the function of the first determination means that the first learning condition is satisfied and it is determined by the function of the second determination means that the second learning condition is not satisfied in the case where it is determined by the function of the action mode determination means that the first action mode has been set and it is determined by the function of the fourth determination means that the delay of the learning process is not permitted.

The ECU 31 and the T-ECU 41 as the action mode determination means determine whether or not, among a plurality of action modes, a second action mode of always constraining the action of the lockup mechanism 3 to the completely locked-up state, for example, the manual shift mode, has been set, from the state of changing of the mode change switch 26, and then restrict the output of the compulsive signal carried out by the function of the compulsive signal output means (the setting of the deceleration-time complete lockup prohibition request flag described below) until it is determined by the third determination means that the delay of the learning process is not permitted (until the travel distance Dt shown in FIG. 8E is reached), if it is determined that the second action mode has been set and it is determined by the function of the fourth determination means that the delay of the learning process is not permitted.

The ECU 31 and the T-ECU 41 further has a function of fifth determination means for determining whether or not a delay equal to or longer than a certain length of time that occurs in the learning process is permitted, on the basis of whether or not, despite occurrence of the delay, the fuel injection performance of the injector 18 can be kept within a high-accuracy region that is pre-set within the specific range of fuel injection performance, for example, a range in which the accuracy decline rate is as high as or below a Line Ln in FIG. 8B.

Besides, the ECU 31 and the T-ECU 41 determines, by the function of the action mode determination means, whether or not, among a plurality of action modes, a third action mode in which the action of the lockup mechanism 3 is temporarily changed to the completely locked-up state only when it is preferable to have the completely locked-up state of the lockup mechanism 3 from the view point of the fuel economy of the engine 1 and the power performance of the power unit. Then, in the case where it is determined that the third action mode has been set and where it is determined by the fifth determination means that a delay of the learning process is not permitted, for example, where the travel distance will reach a travel distance Ds at which it is highly possible that the accuracy decline rate will reach the line Lm in FIG. 8B if the learning process is delayed, the ECU 31 and the T-ECU 41, by the function of the compulsive signal output means, set a compulsive signal, for example, a request flag for prohibiting the deceleration-time complete lockup at the time of a vehicle speed equal to or higher than a upper-limit vehicle speed for prohibition of the lockup.

In the control system for the power unit in the embodiment constructed as described above, the setting process for the learning request flag and the complete lockup prohibition flag is performed by a processing procedure as shown in FIG. 9. Then, according to the set states of the flags, the lockup control on the automatic transmission side is appropriately restricted as needed, and the learning of the injection accuracy of the injector and the correction of the commanded injection amount are repeatedly executed.

Prior to the process shown in FIG. 9, at every certain time following the start of the engine 1, the ECU 31 takes, into specific memory regions within the RAM used for the learning process, the operation state and the load connection state of the engine 1 needed for the determination of satisfaction of the first and second learning conditions (e.g., the slip state equivalent to the neutral state of the automatic transmission 5, and the operation state of the lockup mechanism 3), and the information regarding the accumulated value of the travel distance accumulated from the time of start of use of the injector 18 or the time of completion of the immediately previous learning process. Besides, the ECU 31 takes in the setting information that determines the learning interval (e.g., travel distances Dt, Ds, Dn used by the third to fifth determination means) at the starting of the engine 1.

In the process shown in FIG. 9, firstly the ECU 31, by its novel function as the third determination means, determines whether or not the accumulated value of the travel distance from the time of start of use, or the time of completion of the immediately previous learning process (the time of setting a learning request rank C described below that is near the time of completion of the immediately previous learning process) has reached a set distance Du (see FIG. 8C) that corresponds to a learning start timing (step S31, which is a determination step carried out by the fifth determination means). This learning timing is a timing at which the learning process is considered to be able to be completed at a high probability equal to or higher than a certain probability before the decline rate qe of the injection accuracy of the injector 18 reaches the accuracy line Ln that is located to the higher accuracy side from the permissible limit value La. The learning timing is set as the travel distance Dn that corresponds thereto.

If it is not determined that the learning start timing has arrived (if NO at step S31), substantially the same determination process is repeatedly executed every certain time until the learning start timing arrives.

On the other hand, if it is determined that the learning start timing has arrived (if YES at step S31), it is then determined whether or not, for example, the first learning condition, as various environmental conditions that serve as a prerequisite for execution of the learning process, is satisfied (step S32, which is a determination step carried out by the first determination means). Specifically, it is determined whether or not the condition that (a) the present time is a non-injection time, for example, the time of deceleration fuel cut, during which the commanded injection amount for the injector 18 is less than or equal to zero, (b) the pressure of fuel in the common rail 17 (rail pressure) is maintained within a certain range, and (c) the cooling water temperature of the engine 1 is above a certain temperature, is satisfied.

If the first learning condition is satisfied, an A-flag is set as a learning request flag (step S33). In response to the setting of the A-flag, substantially the same learning process as the learning process of the first embodiment shown in FIG. 6 is executed.

On the other hand, if the first learning condition is not satisfied (if NO at step S32), the travel distance accumulated from the time of start of use or the time of completion of the previous flag setting for the learning request rank C has reached a travel distance equal to or greater than a distance Dt, for example, 900 km (step S34). If the accumulated travel distance has not reached the distance Dt, it is then determined whether or not the travel distance accumulated from the time of start of use or the previous time of setting the learning request rank C has reached a travel distance equal to or greater than a distance Ds, for example, 800 km (step S35). That is, it is determined whether or not the learning has been delayed to such a degree that an accuracy decline that is near a permissible limit occurs in the injection amount of the injector 18.

With regard to the vehicle in accordance with the embodiment, it can sometimes happen that the vehicle travels for long hours with the completely locked-up state of the torque converter 2 during a high-speed travel or during the manual shift mode, and therefore, the satisfaction of the second learning condition that requires the torque converter 2 to have a neutral state-equivalent slip state is not easily obtained. Hence, if the learning time cannot be secured, the travel distance accumulated from, for example, the previous time of setting the learning request rank C, reaches the distance Ds, and the result of the determination at step S35 becomes YES.

In this case, a flag of a learning request rank B is subsequently set (step S36).

This flag of the learning request rank B is read by the T-ECU 41 side where the lockup control is performed. Therefore, the T-ECU 41 side is notified that an order to prohibit the deceleration-time complete lockup can be output, for example, even during a travel mode in which the completely locked-up state is to be entered at the time of a high-speed travel at or above the upper-limit vehicle speed for lockup prohibition.

Next, a determination process of checking whether the first and second learning conditions are satisfied is executed (step S37). If it is determined that the first learning condition and the second learning condition are both satisfied (if YES at step S37), it is then determined whether or not the vehicle is traveling at a high vehicle speed equal to or higher than the upper-limit vehicle speed for lockup prohibition (step S38). If it is determined that the vehicle is traveling at such high speed, a flag for requesting prohibition of the deceleration-time complete lockup is caused to be valid, so that a compulsive signal that requests prohibition of the deceleration-time complete lockup is output from the ECU 31 to the T-ECU 41 (step S39).

Even when the prohibition of the deceleration-time complete lockup during high-speed travel is requested, the learning process does not progress in some cases, for example, in the case where the manual shift mode is selected and the driver continues driving mostly by manual shift operations. In such a case, it comes to be determined in the travel distance determination step S34 that the travel distance accumulated from, for example, the pervious time of setting the learning request rank C, reaches the distance Dt (YES at step S34).

Then, the flag of the learning request rank C is set (step S40), and the flag of the learning request rank C is read by the T-ECU 41 side. Therefore, the T-ECU 41 side is notified that the order to prohibit the deceleration-time complete lockup can be output, for example, during a travel mode in which the completely locked-up state is to be entered regardless of the vehicle speed.

Next, a determination process of re-checking whether the first and second learning conditions are satisfied is executed (step S41). If it is determined that the first learning condition and the second learning condition are both satisfied (if YES at step S41), the flag for requesting the prohibition of the deceleration-time complete lockup is caused to be valid, so that a compulsive signal that requests that the deceleration-time complete lockup be prohibited regardless of the vehicle speed, that is, over the entire vehicle speed range, is output from the ECU 31 to the T-ECU 41 (step S42).

Hence, when the learning condition is satisfied and therefore the learning process as shown in FIG. 6 is executed, the complete lockup action of the lockup mechanism 3 is prohibited by the T-ECU 41, and the lockup mechanism 3 enters a neutral-equivalent released state or a slip state whose slip rate is large. Therefore, the learning process is preferentially advanced.

As a result, correction with respect to the decline rate qe of the injection accuracy that is a difference between the actual injection amount of the injector 18 and the commanded injection amount that is commanded to the injector 18 is certainly executed, so that the injection command signal Iq during ordinary operation is corrected so as to make the target injection amount and the actual injection amount accurately equal to each other.

Thus, in this embodiment, if it is determined that a delay of the learning process is not permitted, a compulsive signal that forces the load connection state of the engine 1 to be a specific connection state (or change to a specific connection state) so as to satisfy the second learning condition, for example, a deceleration-time complete lockup prohibition order that prohibits the complete lockup of the lockup mechanism, is output, so that the learning process can certainly executed without allowing the injection performance of the injector to exceed the permissible limit, and therefore a required injection amount accuracy can be secured. Besides, if it is determined by the third determination means that the delay of the learning process is permitted, drivability can be secured by permitting the delay of the learning process until it is determined that the first learning condition and the second learning condition are both satisfied. Therefore, both securement of drivability and securement of the injection amount accuracy of the injector can achieved.

Incidentally, in the foregoing embodiments, the specific load connection state that satisfies the learning condition is a neutral state-equivalent released state or slip state of the lockup mechanism of the automatic transmission, and the connection state outside the specific connection state is a completely locked-up state of the lockup mechanism of the automatic transmission. However, the connection state outside the specific connection state may also be a locked-up state that allows slippage of a low slip rate near the complete lockup. Besides, although the complete lockup during the deceleration-time fuel cut, which is a main time of the learning process, is prohibited in the foregoing embodiments, it is to be understood that the learning process can also be executed while the complete lockup during another operation state during which the learning process is executed is prohibited. Furthermore, in the second embodiment, the degree of the decline of the injection accuracy of the injector which gradually progresses with continued use is represented by the travel distance of the vehicle accumulated from the previous setting of the C-flag, that is, from immediately before the completion of the previous learning, and the accumulated travel distance is used to determine whether the learning timing has arrived. However, it is also possible to use other degradation indicator values, such as the accumulated operation time of the internal combustion engine, the accumulated number of times of injection or the accumulated time or duration of injection that is equivalent to the accumulated time of use of the injector, heat history, etc.

As described above, the invention advantageously provides a fuel injection amount control apparatus for an internal combustion engine which is capable of achieving both securement of required injection amount accuracy and securement of drivability in the following manner. That is, when it is determined that a delay of the learning process is not permitted, the control apparatus forces the load connection state of the internal combustion engine to be a specific connection state (or change to a specific connection state) so as to satisfy the second learning condition, and therefore causes the learning process to be preferentially executed. On the other hand, when it is determined by the third determination means that the delay of the learning process is permitted, the control apparatus causes delay of the learning process to be permitted until both the first learning condition and the second learning condition are satisfied naturally without performing any special processing for the satisfaction. The invention also advantageously provides a control system for a power unit which is capable of achieving both securement of required injection amount accuracy and securement of drivability in the following manner. That is, when the first learning condition is satisfied but the second learning condition is not satisfied while it is determined that a delay of the learning process is not permitted, the control system outputs the compulsive signal that forces the completely locked-up state of the lockup mechanism to be prohibited so as to satisfy the second learning condition, and therefore causes the learning process to be preferentially executed. On the other hand, when it is determined by the third determination means that the delay of the learning process is permitted, the control system causes the delay of the learning process to be permitted until it is determined that both the first learning condition and the second learning condition are satisfied. Thus, the invention is useful generally to the fuel injection amount control apparatuses for internal combustion engines which learn degradation of the injection performance of the fuel injection valves of vehicle-mounted internal combustion engines, and which execute the actual fuel injection amount control commensurate with the injection performance, and to the control systems for power units as well.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. A fuel injection amount control apparatus for an internal combustion engine which generates an injection command signal that commands an injector of the internal combustion engine to inject fuel, and executes a learning process of learning change in fuel injection performance of the injector under a pre-set learning condition, and corrects the injection command signal according to a result of the learning process, comprising:

a rotation speed detection portion that detects engine rotation speed of the internal combustion engine;

a first determination portion that determines whether or not a first learning condition regarding operation state of the internal combustion engine is satisfied;

a second determination portion that determines whether or not a second learning condition regarding load connection state of the internal combustion engine is satisfied;

a learning-purpose injection command portion that commands the injector to perform a learning-purpose injection with a pre-set commanded injection amount when it is determined that both the first learning condition and the second learning condition are satisfied;

a performance value calculation portion that calculates an amount of change in the engine rotation speed of the internal combustion engine caused by the learning-purpose injection based on detected information from the rotation speed detection portion, when the learning-purpose injection is performed by the injector according to the command from the learning-purpose injection command portion, and calculating an injection performance value that corresponds to an actual injection amount of the injector based on the amount of change;

a correction portion that corrects the injection command signal according to a difference between the actual injection amount of the injector that is specifically determined from the injection performance value and the commanded injection amount that is commanded to the injector;

a third determination portion that determines whether or not a delay equal to or longer than a certain length of time which occurs in the learning process is permitted, based on whether or not the learning process, despite occurrence of the delay of the learning process, is able to be completed before the fuel injection performance of the injector reaches a pre-set permissible limit value; and a compulsive signal output portion that outputs a compulsive signal that forces the load connection state of the internal combustion engine to be a specific connection state so as to satisfy the second learning condition, when it is determined by the third determination portion that the delay of the learning process is not permitted, wherein when it is determined by the third determination portion that the delay of the learning process is permitted, the delay of the learning process is permitted until it is determined that both the first learning condition and the second learning condition are satisfied.

2. The fuel injection amount control apparatus according to claim 1, wherein:

the internal combustion engine is mounted in a vehicle;

the vehicle includes a power transmission apparatus that has a torque converter that transmits power from the internal combustion engine, and a lockup mechanism that locks up the torque converter; and the compulsive signal is a command signal that prohibits lockup performed by the lockup mechanism.

3. The fuel injection amount control apparatus according to claim 1, wherein the third determination portion determines a timing at which the delay of the learning process becomes impermissible in order to complete the learning process immediately before the fuel injection performance of the injector reaches the permissible limit value, based on accumulated information that corresponds to an accumulated time of use of the injector.

4. The fuel injection amount control apparatus according to claim 1, further comprising:

an action mode determination portion that determines whether or not, among a plurality of action modes regarding a load connected to the internal combustion engine, a first action mode of changing the load connection state of the internal combustion engine between the specific connection state and another connection state outside the specific connection state has been set; and a fourth determination portion that determines whether or not the delay equal to or longer than the certain length of time which occurs in the learning process is permitted, based on whether or not, despite occurrence of the delay of the learning process, the fuel injection performance of the injector is able to be maintained in a specific range of the fuel injection performance that is better than the permissible limit value, wherein if it is determined by the action mode determination portion that the first action mode has been set and it is determined by the fourth determination portion that the delay of the learning process is not permitted, then it is determined by the first determination portion that the first learning condition is satisfied, and when it is determined by the second determination portion that the second learning condition is not satisfied, the compulsive signal output portion outputs the compulsive signal.

5. The fuel injection amount control apparatus according to claim 4, wherein:

the action mode determination portion determines whether or not, among the plurality of action modes, a second mode of always constraining the load connection state of the internal combustion engine to the connection state outside the specific connection state has been set; and when it is determined by the fourth determination portion that the delay of the learning process is permitted while it is determined that the second action mode has been set, the compulsive signal output portion restricts output of the compulsive signal until it is determined by the third determination portion that the delay of the learning process is not permitted.

6. A control system for a power unit that includes an internal combustion engine, and an power transmission apparatus that has a torque converter that transmits power from the internal combustion engine, and a lockup mechanism that locks up the torque converter, the control system comprising:

a fuel injection amount control apparatus which generates an injection command signal that commands an injector of the internal combustion engine to inject fuel, and which learns change in fuel injection performance of the injector under a pre-set learning condition, and which corrects the injection command signal according to a result of learning; and a lockup control apparatus that controls operation of the lockup mechanism of the automatic transmission, wherein the fuel injection amount control apparatus includes:

a rotation speed detection portion that detects engine rotation speed of the internal combustion engine;

a first determination portion that determines whether or not a first learning condition regarding operation state of the internal combustion engine is satisfied;

a second determination portion that determines whether or not a second learning condition regarding operation state of the lockup mechanism is satisfied;

a learning-purpose injection command portion that commands the injector to perform a learning-purpose injection with a pre-set commanded injection amount when it is determined that both the first learning condition and the second learning condition are satisfied;

a performance value calculation portion that calculates an amount of change in the engine rotation speed of the internal combustion engine caused by the learning-purpose injection based on detected information from the rotation speed detection portion, when the learning-purpose injection is performed by the injector according to the command from the learning-purpose injection command portion, and calculating an injection performance value that corresponds to an actual injection amount of the injector based on the amount of change;

a correction portion that corrects the injection command signal according to a difference between the actual injection amount of the injector that is specifically determined from the injection performance value and the commanded injection amount that is commanded to the injector;

a third determination portion that determines whether or not a delay equal to or longer than a certain length of time which occurs in the learning process is permitted, based on whether or not the learning process, despite occurrence of the delay of the learning process, is able to be completed before the fuel injection performance of the injector reaches a pre-set permissible limit value; and a compulsive signal output portion that outputs to the lockup control apparatus a compulsive signal that forces a completely locked-up state of the lockup mechanism to be prohibited so as to satisfy the second learning condition, when it is determined by the first determination portion that the first learning condition is satisfied and it is determined by the second determination portion that the second learning condition is not satisfied while it is determined by the third determination portion that the delay of the learning process is not permitted, and wherein when the lockup control apparatus inputs the compulsive signal, the lockup control apparatus restricts action of the lockup mechanism within a range in which the lockup mechanism does not assume the completely locked-up state, and when it is determined by the third determination portion that the delay of the learning process is permitted, the control system permits the delay of the learning process until it is determined that both the first learning condition and the second learning condition are satisfied.

7. The control system according to claim 6, further comprising:

an action mode determination portion that determines, among a plurality of action modes regarding a load connected to the internal combustion engine, a first action mode of changing the action of the lockup mechanism between a non-constraint state in which the action of the lockup mechanism is not constrained to a completely locked-up state and a constraint state in which the action of the lockup mechanism is constrained to the completely locked-up state has been set; and a fourth determination portion that determines whether or not the delay equal to or longer than the certain length of time which occurs in the learning process is permitted, based on whether or not, despite occurrence of the delay of the learning process, the fuel injection performance of the injector is able to be maintained in a specific range of the fuel injection performance that is better than the permissible limit value, wherein if it is determined by the action mode determination portion that the first action mode has been set and it is determined by the fourth determination portion that the delay of the learning process is not permitted, then it is determined by the first determination portion that the first learning condition is satisfied, and when it is determined by the second determination portion that the second learning condition is not satisfied, the compulsive signal output portion outputs the compulsive signal.

8. The control system according to claim 7, wherein the first action mode is a high-vehicle-speed-time lockup mode in which the action of the lockup mechanism is constrained to the completely locked-up state when the vehicle travels at or above a certain vehicle speed, and the action of the lockup mechanism is not constrained to the completely locked-up state when the vehicle travels below the certain vehicle speed.

9. The control system according to claim 7, wherein:

the action mode determination portion determines whether or not, among the plurality of action modes, a second action mode of always constraining the action of the lockup mechanism to the completely locked-up state has been set; and when it is determined by the fourth determination portion that the delay of the learning process is permitted while it is determined that the second action mode has been set, the compulsive signal output portion restricts output of the compulsive signal until it is determined by the third determination portion that the delay of the learning process is not permitted.

10. The control system according to claim 7, further comprising fifth determination portion that determines whether or not the delay equal to or longer than the certain length of time which occurs in the learning process is permitted, based on whether or not, despite occurrence of the delay of the learning process, the fuel injection performance of the injector is able to be kept within a high-accuracy region that is pre-set within the specific range of the fuel injection performance, wherein the action mode determination portion determines whether or not, among the plurality of action modes, a third action mode in which the action of the lockup mechanism is temporarily changed to the completely locked-up state only when it is preferable that the action of the lockup mechanism be in the completely locked-up state in view of fuel economy of the internal combustion engine and power performance of the power unit has been set, and wherein when it is determined by the fifth determination portion that the delay of the learning process is not permitted while it is determined that the third action mode has been set, the compulsive signal output portion outputs the compulsive signal.

11. The control system according to claim 6, wherein:

the internal combustion engine is a diesel engine in which a fuel injection from the injector during a compression stroke is executed by a plurality of divided injection actions that include an injection of a very small amount; and the learning-purpose injection is executed with a commanded injection amount that is close to the very small amount of injection.

12. The control system according to claim 11, wherein the commanded injection amount is a fuel injection amount that is close to a pilot injection amount that is provided near a piston top dead center of the internal combustion engine.

13. A fuel injection amount control method for an internal combustion engine which generates an injection command signal that commands an injector of the internal combustion engine to inject fuel, and executes a learning process of learning change in fuel injection performance of the injector under a pre-set learning condition, and corrects the injection command signal according to a result of the learning process, comprising:

detecting engine rotation speed of the internal combustion engine;

determining whether or not a first learning condition regarding operation state of the internal combustion engine is satisfied;

determining whether or not a second learning condition regarding load connection state of the internal combustion engine is satisfied;

commanding the injector to perform a learning-purpose injection with a pre-set commanded injection amount when it is determined that both the first learning condition and the second learning condition are satisfied;

calculating an amount of change in the engine rotation speed of the internal combustion engine caused by the learning-purpose injection based on the engine rotation speed detected, when the learning-purpose injection is performed by the injector, and calculating an injection performance value that corresponds to an actual injection amount of the injector based on the amount of change;

correcting the injection command signal according to a difference between the actual injection amount of the injector that is specifically determined from the injection performance value and the commanded injection amount that is commanded to the injector;

determining whether or not a delay equal to or longer than a certain length of time which occurs in the learning process is permitted, based on whether or not the learning process, despite occurrence of the delay of the learning process, is able to be completed before the fuel injection performance of the injector reaches a pre-set permissible limit value; and outputting a compulsive signal that forces the load connection state of the internal combustion engine to be a specific connection state so as to satisfy the second learning condition, when it is determined that the delay of the learning process is not permitted, wherein when it is determined that the delay of the learning process is permitted, the delay of the learning process is permitted until it is determined that both the first learning condition and the second learning condition are satisfied.

* * * * *